(12) United States Patent
Son

(10) Patent No.: US 9,291,797 B2
(45) Date of Patent: Mar. 22, 2016

(54) LENS MODULE

(71) Applicant: SAMSUNG ELECTRO-MECHANICS CO., LTD., Suwon (KR)

(72) Inventor: Ju Hwa Son, Suwon (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 14/135,438

(22) Filed: Dec. 19, 2013

(65) Prior Publication Data

US 2015/0109692 A1    Apr. 23, 2015

(30) Foreign Application Priority Data

Oct. 18, 2013  (KR) .................. 10-2013-0124456

(51) Int. Cl.
*G02B 9/62*    (2006.01)
*G02B 13/00*   (2006.01)

(52) U.S. Cl.
CPC .............. *G02B 9/62* (2013.01); *G02B 13/006* (2013.01); *G02B 13/0045* (2013.01)

(58) Field of Classification Search
CPC .............. G02B 9/00; G02B 9/62; G02B 9/64
USPC .......................... 359/708, 713, 754–757, 759
See application file for complete search history.

(56) References Cited

U.S. PATENT DOCUMENTS

| | | | |
|---|---|---|---|
| 8,743,482 B1* | 6/2014 | Tsai et al. | ...................... 359/757 |
| 2012/0243108 A1 | 9/2012 | Tsai | |
| 2012/0314301 A1 | 12/2012 | Huang | |
| 2013/0242362 A1 | 9/2013 | Nakayama et al. | |
| 2014/0111876 A1* | 4/2014 | Tang et al. | ...................... 359/757 |
| 2014/0192422 A1* | 7/2014 | Tang et al. | ...................... 359/713 |
| 2014/0320980 A1* | 10/2014 | Chen | ............................. 359/713 |

FOREIGN PATENT DOCUMENTS

JP    2013-54294    3/2013
JP    2013-190515   9/2013

OTHER PUBLICATIONS

Office Action dated Sep. 30, 2014 for Korean Patent Application No. 10-2013-0124456 and its English summary provided by Applicant's foreign counsel.

* cited by examiner

*Primary Examiner* — Darryl J Collins
(74) *Attorney, Agent, or Firm* — NSIP Law

(57) ABSTRACT

There is provided a lens module including: a first lens having positive refractive power; a second lens having negative refractive power; a third lens having negative refractive power; a fourth lens having refractive power; a fifth lens having negative refractive power and having a shape in which an image-side surface thereof is convex; and a sixth lens having refractive power, having a shape in which an image-side surface thereof is concave, and having at least one point of inflection formed on the image-side surface thereof.

27 Claims, 32 Drawing Sheets

|  | RADIUS OF CURVATURE | THICKNESS OR DISTANCE | GLA |
|---|---|---|---|
| OBJ: | INFINITY | INFINITY | |
| 1: | INFINITY | 0.000000 | |
| STO: | 1.78709 | 0.573657 | 544100.560927 |

K : -0.820656
A :0.119494E-02   B :-.178328E-01   C :0.118693E-01   D :-.294567E-01

3:     -97.16623   0.060000

K : -16.034121
A :-.665397E-01   B :-.112257E-01   C :0.344671E-01   D :-.292331E-01

4:     -36.62646   0.230000   639800.232654

K : 2.743452
A :-.830742E-02   B :-.200101E-01   C :0.702745E-01   D :-.287987E-01

5:      4.00839   0.185825

K : 0.763775
A :0.289837E-02   B :-.218587E-02   C :-.589896E-03   D :0.375276E-03

6:      3.35281   0.530450   639800.232654

K : -9.828494
A :-.537485E-01   B :0.964449E-02   C :-.262873E-01   D :-.531953E-02
E :0.195704E-01

7:      3.04801   0.199039

K : -1.795042
A :-.814163E-01   B :-.341280E-02   C :0.379781E-01   D :-.706242E-01
E :0.358322E-01

8:      3.83135   0.384548   544100.560928

K : -19.970069
A :-.121749E-01   B :-.506300E-02   C :-.132963E-01   D :0.151964E-01
E :-.917914E-02

9:     576.90629   0.459886

K : 9.631903   A :-.131147E-01   B :-.301195E-01   C :0.217811E-01

10:    -5.22179   0.364231   639800.232654

K: 2.7973E+00
A: 2.7993E-01       B: -6.6134E-01   C: 1.0778E+00   D: -1.3590E+00
E: 1.0428E+00       F: -4.4297E-01   G: 7.9018E-02

11:    -5.49662   0.060000

ASP:
K : 4.290265
CUF: 0.000000
A :0.202144E+00   B :-.380409E+00   C :0.593601E+00   D :-.748436E+00
E :0.617323E+00   F :-.320856E+00   G :0.101544E+00   H :-.178078E-01
J :0.132268E-02

12:     2.93178   0.820892   544100.560928

K: -4.1416E+01
A: -1.3350E-01   B: 3.0486E-03   C: 2.3147E-02   D: -7.0152E-03   E: 6.4186E-04

13:     1.49589   0.249500

K : -8.694162
A :-.498588E-01   B :0.586755E-03   C :0.501885E-02   D :-.270546E-02
E :0.802018E-03   F :-.148710E-03   G :0.166228E-04   H :-.101886E-05
J :0.263631E-07

14:    INFINITY   0.210000   516798.641983
15:    INFINITY   0.594073
IMG:   INFINITY   0.003938

FIG. 4

|  | RADIUS OF CURVATURE | THICKNESS OR DISTANCE | GLA |  |  |  |  |  |
|---|---|---|---|---|---|---|---|---|
| OBJ: | INFINITY | INFINITY |  |  |  |  |  |  |
| 1: | INFINITY | 0.000000 |  |  |  |  |  |  |
| STO: | 1.71930 | 0.604006 | 544100.560927 |  |  |  |  |  |
| K : | -0.711081 |  |  |  |  |  |  |  |
| A :0.419097E-02 | B :-.191887E-01 | C :0.146386E-01 | D :-.302549E-01 |  |  |  |  |  |
| 3: | -44.23582 | 0.061318 |  |  |  |  |  |  |
| K : | -16.034121 |  |  |  |  |  |  |  |
| A :-.743252E-01 | B :0.968971E-01 | C :-.114823E+00 | D :0.338271E-01 |  |  |  |  |  |
| 4: | 9.18649 | 0.230000 | 639800.232654 |  |  |  |  |  |
| K : | 2.743452 |  |  |  |  |  |  |  |
| A :-.820252E-01 | B :0.166029E+00 | C :-.128058E+00 | D :0.510066E-01 |  |  |  |  |  |
| 5: | 2.47447 | 0.227523 |  |  |  |  |  |  |
| K : | 0.961752 |  |  |  |  |  |  |  |
| A :-.487197E-01 | B :0.528416E-01 | C :-.207019E-01 | D :0.275939E-02 |  |  |  |  |  |
| 6: | 6.27149 | 0.369172 | 639800.232654 |  |  |  |  |  |
| K : | -2.561757 |  |  |  |  |  |  |  |
| A :-.543774E-01 | B :-.393579E-01 | C :-.290650E-01 | D :0.643784E-01 |  |  |  |  |  |
| E :-.783255E-02 |  |  |  |  |  |  |  |  |
| 7: | 5.53157 | 0.091194 |  |  |  |  |  |  |
| K : | 21.782838 |  |  |  |  |  |  |  |
| A :-.949260E-01 | B :-.948636E-02 | C :-.471635E-01 | D :0.729457E-01 |  |  |  |  |  |
| E :-.137660E-01 |  |  |  |  |  |  |  |  |
| 8: | 4.15247 | 0.373946 | 544100.560927 |  |  |  |  |  |
| K : | -19.965144 |  |  |  |  |  |  |  |
| A :-.493280E-01 | B :0.201687E-01 | C :-.674327E-01 | D :0.901993E-01 |  |  |  |  |  |
| E :-.295835E-01 |  |  |  |  |  |  |  |  |
| 9: | 17.27186 | 0.479191 |  |  |  |  |  |  |
| K : | 9.631903 |  |  |  |  |  |  |  |
| A :-.312293E-01 | B :-.491102E-01 | C :0.324890E-01 | D :0.000000E+00 |  |  |  |  |  |
| 10: | -4.20595 | 0.347732 | 639800.232654 |  |  |  |  |  |
| K : | -1.689336 |  |  |  |  |  |  |  |
| A :0.274025E+00 | B :-.478996E+00 | C :0.513245E+00 | D :-.541570E+00 |  |  |  |  |  |
| E :0.394047E+00 | F :-.170309E+00 | G :0.320090E-01 |  |  |  |  |  |  |
| 11: | -4.51655 | 0.060000 |  |  |  |  |  |  |
| K : | 5.327826 |  |  |  |  |  |  |  |
| A :0.156907E+00 | B :-.500343E-01 | C :-.220445E+00 | D :0.335090E+00 |  |  |  |  |  |
| E :-.264220E+00 | F :0.131028E+00 | G :-.410058E-01 | H :0.750179E-02 |  |  |  |  |  |
| J :-.616652E-03 |  |  |  |  |  |  |  |  |
| 12: | 2.69971 | 0.955437 | 544100.560927 |  |  |  |  |  |
| K : | -41.938466 |  |  |  |  |  |  |  |
| A :-.629626E-01 | B :-.534469E-01 | C :0.449891E-01 | D :-.121695E-01 |  |  |  |  |  |
| E :0.114486E-02 |  |  |  |  |  |  |  |  |
| 13: | 1.58897 | 0.277225 |  |  |  |  |  |  |
| K : | -8.125230 |  |  |  |  |  |  |  |
| A :-.408822E-01 | B :0.668209E-03 | C :0.365074E-02 | D :-.176174E-02 |  |  |  |  |  |
| E :0.464863E-03 | F :-.780867E-04 | G :0.796111E-05 | H :-.445063E-06 |  |  |  |  |  |
| J :0.105035E-07 |  |  |  |  |  |  |  |  |
| 14: | INFINITY | 0.210000 | 516798.641983 |  |  |  |  |  |
| 15: | INFINITY | 0.627062 |  |  |  |  |  |  |
| IMG: | INFINITY | 0.003386 |  |  |  |  |  |  |

FIG. 8

|  | RADIUS OF CURVATURE | THICKNESS OR DISTANCE | GLA | | | | |
|---|---|---|---|---|---|---|---|
| OBJ: | INFINITY | INFINITY | | | | | |
| 1: | INFINITY | 0.000000 | | | | | |
| STO: | 1.55976 | 0.572669 | 544100.560927 | | | | |
| K : | -0.242889 | | | | | | |
| A : | 0.101915E-01 | B :-.960553E-02 | C :0.245855E-01 | D :-.266950E-01 | | | |
| 3: | 193.21611 | 0.060006 | | | | | |
| K : | -15.193302 | | | | | | |
| A : | -.355200E-01 | B :0.762585E-01 | C :-.897287E-01 | D :0.375447E-01 | | | |
| 4: | 12.10126 | 0.230000 | 639800.232654 | | | | |
| K : | 2.649704 | | | | | | |
| A : | -.751554E-01 | B :0.153592E+00 | C :-.148017E+00 | D :0.927045E-01 | | | |
| 5: | 3.10157 | 0.310799 | | | | | |
| K : | -0.750963 | | | | | | |
| A : | -.575614E-01 | B :0.739499E-01 | C :-.719170E-01 | D :0.258356E-01 | | | |
| 6: | -100.00909 | 0.300000 | 639800.232654 | | | | |
| K : | 14.783170 | | | | | | |
| A : | -.974371E-01 | B :-.993162E-01 | C :0.117426E+00 | D :-.297897E+00 | | | |
| E : | 0.203234E+00 | | | | | | |
| 7: | 9.12806 | 0.066838 | | | | | |
| K : | -0.495908 | | | | | | |
| A : | -.116846E+00 | B :0.338940E-01 | C :-.189356E-01 | D :-.147756E-01 | | | |
| E : | 0.473142E-01 | | | | | | |
| 8: | 33.46889 | 0.422237 | 544100.560927 | | | | |
| K : | -19.981067 | | | | | | |
| A : | -.155360E+00 | B :0.102263E+00 | C :-.437412E-01 | D :0.990698E-01 | | | |
| E : | -.433205E-01 | | | | | | |
| 9: | -5.33826 | 0.519002 | | | | | |
| K : | 8.531503 | | | | | | |
| A : | -.866170E-01 | B :-.267847E-01 | C :0.616769E-01 | D :0.000000E+00 | | | |
| 10: | -3.27389 | 0.256946 | 639800.232654 | | | | |
| K : | -10.334219 | | | | | | |
| A : | 0.325330E+00 | B :-.741267E+00 | C :0.104180E+01 | D :-.116816E+01 | | | |
| E : | 0.836015E+00 | F :-.335143E+00 | G :0.563486E-01 | H :0.000000E+00 | | | |
| J : | 0.000000E+00 | | | | | | |
| 11: | -3.46933 | 0.060000 | | | | | |
| K : | 3.268714 | | | | | | |
| A : | 0.175103E+00 | B :-.211560E+00 | C :0.171608E+00 | D :-.149801E+00 | | | |
| E : | 0.616895E-01 | F :0.254799E-01 | G :-.382683E-01 | H :0.149192E-01 | | | |
| J : | -.200102E-02 | | | | | | |
| 12: | 2.69497 | 0.976037 | 544100.560927 | | | | |
| K : | -37.302693 | | | | | | |
| A : | -.187164E+00 | B :0.780055E-01 | C :-.271948E-01 | D :0.775596E-02 | | | |
| E : | -.923416E-03 | | | | | | |
| 13: | 1.52810 | 0.265777 | | | | | |
| K : | -8.218200 | | | | | | |
| A : | -.516086E-01 | B :0.539623E-02 | C :0.436630E-02 | D :-.325369E-02 | | | |
| E : | 0.107995E-02 | F :-.212681E-03 | G :0.250201E-04 | H :-.161399E-05 | | | |
| J : | 0.439520E-07 | | | | | | |
| 14: | INFINITY | 0.210000 | BSC7_HOYA | | | | |
| 15: | INFINITY | 0.597990 | | | | | |
| IMG: | INFINITY | 0.001105 | | | | | |

FIG. 12

|      | RADIUS OF CURVATURE | THICKNESS OR DISTANCE | GLA |   |   |   |   |
|------|---|---|---|---|---|---|---|
| OBJ: | INFINITY | INFINITY | | | | | |
| 1:   | INFINITY | 0.000000 | | | | | |
| STO: | 1.56085 | 0.569430 | 544100.560927 | | | | |
| K :  | -0.218401 | | | | | | |
| A :  | 0.105947E-01 | B :-.891835E-02 | C :0.239954E-01 | D :-.250652E-01 | | | |
| 3:   | -60.60629 | 0.060000 | | | | | |
| K :  | -15.193302 | | | | | | |
| A :  | -.435781E-01 | B :0.120829E+00 | C :-.148564E+00 | D :0.675772E-01 | | | |
| 4:   | 15.26966 | 0.230000 | 639800.232654 | | | | |
| K :  | 2.627585 | | | | | | |
| A :  | -.944711E-01 | B :0.225776E+00 | C :-.246568E+00 | D :0.141259E+00 | | | |
| 5:   | 2.96118 | 0.333805 | | | | | |
| K :  | -1.024831 | | | | | | |
| A :  | -.678895E-01 | B :0.112185E+00 | C :-.123528E+00 | D :0.461601E-01 | | | |
| 6:   | -100.04708 | 0.300000 | 639800.232654 | | | | |
| K :  | 14.783170 | | | | | | |
| A :  | -.105692E+00 | B :-.794144E-01 | C :0.362948E-01 | D :-.254861E+00 | | | |
| E :  | 0.202045E+00 | | | | | | |
| 7:   | 18.08025 | 0.073955 | | | | | |
| K :  | -0.495908 | | | | | | |
| A :  | -.144510E+00 | B :0.175742E+00 | C :-.229536E+00 | D :0.128999E+00 | | | |
| E :  | 0.573111E-02 | | | | | | |
| 8:   | -16.34357 | 0.448636 | 544100.560927 | | | | |
| K :  | -19.981067 | | | | | | |
| A :  | -.202808E+00 | B :0.278987E+00 | C :-.187676E+00 | D :0.126165E+00 | | | |
| E :  | -.383700E-01 | | | | | | |
| 9:   | -4.62434 | 0.437407 | | | | | |
| K :  | 8.531487 | | | | | | |
| A :  | -.108231E+00 | B :0.521842E-02 | C :0.438050E-01 | | | | |
| 10:  | -3.20330 | 0.258275 | 544100.560927 | | | | |
| K :  | -10.334256 | | | | | | |
| A :  | 0.371881E+00 | B :-.796653E+00 | C :0.107142E+01 | D :-.112622E+01 | | | |
| E :  | 0.755135E+00 | F :-.284913E+00 | G :0.454626E-01 | | | | |
| 11:  | -3.37189 | 0.060000 | | | | | |
| K :  | 3.008120 | | | | | | |
| A :  | 0.139842E+00 | B :-.111831E-01 | C :-.255794E+00 | D :0.435853E+00 | | | |
| E :  | -.477643E+00 | F :0.348920E+00 | G :-.158353E+00 | H :0.399503E-01 | | | |
| J :  | -.424186E-02 | | | | | | |
| 12:  | 2.48752 | 1.020314 | 544100.560927 | | | | |
| K :  | -37.302852 | | | | | | |
| CUF: | 0.000000 | | | | | | |
| A :  | -.182993E+00 | B :0.844684E-01 | C :-.367861E-01 | D :0.117377E-01 | | | |
| E :  | -.143887E-02 | | | | | | |
| 13:  | 1.49637 | 0.281081 | | | | | |
| K :  | -8.217991 | | | | | | |
| A :  | -.444313E-01 | B :0.498076E-03 | C :0.719619E-02 | D :-.450474E-02 | | | |
| E :  | 0.150589E-02 | F :-.309817E-03 | G :0.384597E-04 | H :-.261792E-05 | | | |
| J :  | 0.752271E-07 | | | | | | |
| 14:  | INFINITY | 0.210000 | 516798.641983 | | | | |
| 15:  | INFINITY | 0.596092 | | | | | |
| IMG: | INFINITY | 0.002232 | | | | | |

FIG. 16

|  | RADIUS OF CURVATURE | THICKNESS OR DISTANCE | GLA |
|---|---|---|---|
| OBJ: | INFINITY | INFINITY | |
| 1: | INFINITY | 0.000000 | |
| STO: | 1.61717 | 0.689175 | 544100.560927 |

K : -0.104420
A :0.582758E-02  B :-.204273E-02  C :0.870045E-02  D :-.572754E-02
3:      63.52786      0.068135
K : -15.193302
A :-.318878E-01  B :0.855449E-01  C :-.947341E-01  D :0.398659E-01
4:      13.82077      0.230000        639800.232654
K :   2.649704
A :-.802514E-01  B :0.166077E+00  C :-.169534E+00  D :0.822948E-01
5:       2.99038      0.283719
K : -1.555006
A :-.600096E-01  B :0.991212E-01  C :-.107794E+00  D :0.382284E-01
6:      11.01189      0.300000        639800.232654
K :  14.783170
A :-.108302E+00  B :-.468680E-01  C :0.618691E-01  D :-.225125E+00
E :0.140507E+00
7:       5.78897      0.091315
K : -0.495908
A :-.120362E+00  B :0.383580E-01  C :-.411613E-02  D :-.433768E-01
E :0.437043E-01
8:      56.39840      0.450168        544100.560927
K : -19.981067
A :-.126508E+00  B :0.375540E-01  C :0.561259E-01  D :-.642733E-02
E :-.601935E-02
9:      -4.53450      0.511851
K :   8.982917
A :-.626928E-01  B :-.340685E-01  C :0.541155E-01  D :0.000000E+00
10:     -2.79527      0.261865        639800.232654
K : -10.334219
A :0.272844E+00  B :-.592831E+00  C :0.785360E+00  D :-.815507E+00
E :0.540275E+00  F :-.199897E+00  G :0.308894E-01
11:     -3.06757      0.060000
K :   2.069190
A :0.146339E+00  B :-.171301E+00  C :0.172173E+00  D :-.172794E+00
E :0.977997E-01  F :-.152614E-01  G :-.110369E-01  H :0.562535E-02
J :-.764379E-03
12:      2.90028      1.006310        544100.560927
K : -37.302693
A :-.192545E+00  B :0.892807E-01  C :-.334636E-01  D :0.861681E-02
E :-.896759E-03
13:      1.61577      0.266982
K : -8.218199
A :-.477675E-01  B :0.480852E-02  C :0.373653E-02  D :-.273228E-02
E :0.877130E-03  F :-.166653E-03  G :0.189341E-04  H :-.117958E-05
J :0.310223E-07
14:     INFINITY      0.210000        516798.641983
15:     INFINITY      0.598312
IMG:    INFINITY      0.000719

FIG. 20

|  | RADIUS OF CURVATURE | THICKNESS OR DISTANCE | GLA | | | | | |
|---|---|---|---|---|---|---|---|---|
| OBJ: | INFINITY | INFINITY | | | | | | |
| 1: | INFINITY | 0.000000 | | | | | | |
| STO: | 1.65253 | 0.792111 | 544100.560927 | | | | | |
| K : | − 0.107238 | | | | | | | |
| A :0.331958E- 02 | | B :0.215407E- 02 | | C :0.200018E- 02 | | D :- .170354E- 02 | | |
| 3: | 43.99556 | 0.078740 | | | | | | |
| K : | − 15.193302 | | | | | | | |
| A :- .221067E- 01 | | B :0.622115E- 01 | | C :- .608834E- 01 | | D :0.216505E- 01 | | |
| 4: | 9.91755 | 0.230029 | 639800.232654 | | | | | |
| K : | 2.649704 | | | | | | | |
| A :- .803570E- 01 | | B :0.153467E+00 | | C :- .139825E+00 | | D :0.585236E- 01 | | |
| 5: | 2.76946 | 0.285300 | | | | | | |
| K : | − 1.341851 | | | | | | | |
| A :- .633413E- 01 | | B :0.985764E- 01 | | C :- .845166E- 01 | | D :0.247283E- 01 | | |
| 6: | 7.63252 | 0.300000 | 639800.232654 | | | | | |
| K : | 14.783170 | | | | | | | |
| A :- .116532E+00 | | B :0.695762E- 02 | | C :- .394403E- 01 | | D :- .102110E+00 | | |
| E :0.789816E- 01 | | | | | | | | |
| 7: | 4.95694 | 0.085088 | | | | | | |
| K : | − 0.495908 | | | | | | | |
| A :- .119941E+00 | | B :0.539328E- 01 | | C :- .302308E- 01 | | D :- .269015E- 01 | | |
| E :0.329435E- 01 | | | | | | | | |
| 8: | 44.51337 | 0.471837 | 544100.560927 | | | | | |
| K : | − 19.981067 | | | | | | | |
| A :- .119713E+00 | | B :0.527872E- 01 | | C :0.253391E- 01 | | D :0.745556E- 02 | | |
| E :- .833999E- 02 | | | | | | | | |
| 9: | − 4.39402 | 0.438559 | | | | | | |
| K : | 9.524648 | | | | | | | |
| A :- .428350E- 01 | | B :- .497094E- 01 | | C :0.570228E- 01 | | | | |
| 10: | − 2.72978 | 0.330000 | 639800.232654 | | | | | |
| K : | − 10.334219 | | | | | | | |
| A :0.236514E+00 | | B :- .471324E+00 | | C :0.568271E+00 | | D :- .574465E+00 | | |
| E :0.382082E+00 | | F :- .142316E+00 | | G :0.219875E- 01 | | | | |
| 11: | − 3.20223 | 0.062003 | | | | | | |
| K : | 2.071208 | | | | | | | |
| A :0.670287E- 01 | | B :0.441718E- 01 | | C :- .147783E+00 | | D :0.120112E+00 | | |
| E :- .615378E- 01 | | F :0.284601E- 01 | | G :- .117299E- 01 | | H :0.302401E- 02 | | |
| J :- .322334E- 03 | | | | | | | | |
| 12: | 2.40157 | 0.913918 | 544100.560927 | | | | | |
| K : | − 37.302695 | | | | | | | |
| A :- .163352E+00 | | B :0.577945E- 01 | | C :- .192286E- 01 | | D :0.523364E- 02 | | |
| E :- .554504E- 03 | | | | | | | | |
| 13: | 1.52675 | 0.265543 | | | | | | |
| K : | − 8.218175 | | | | | | | |
| A :- .479932E- 01 | | B :0.242774E- 02 | | C :0.486457E- 02 | | D :- .306004E- 02 | | |
| E :0.955418E- 03 | | F :- .182112E- 03 | | G :0.209543E- 04 | | H :- .132208E- 05 | | |
| J :0.352134E- 07 | | | | | | | | |
| 14: | INFINITY | 0.210000 | 516798.641983 | | | | | |
| 15: | INFINITY | 0.568139 | | | | | | |
| IMG: | INFINITY | 0.030000 | | | | | | |

FIG. 24

|  | RADIUS OF CURVATURE | THICKNESS OR DISTANCE | GLA |  |  |
|---|---|---|---|---|---|
| OBJ: | INFINITY | INFINITY |  |  |  |
| 1: | INFINITY | 0.000000 |  |  |  |
| 2: | 1.69683 | 0.783656 | 544100.560927 |  |  |
| K : | −0.118549 |  |  |  |  |
| A : | 0.258572E−02 | B :0.269648E−02 | C :−.405271E−03 | D :−.341156E−03 |  |
| 3: | 57.76147 | 0.078356 |  |  |  |
| K : | −15.193302 |  |  |  |  |
| A : | −.154039E−01 | B :0.428626E−01 | C :−.408585E−01 | D :0.152619E−01 |  |
| 4: | 8.20588 | 0.230000 | 639800.232654 |  |  |
| K : | 2.649704 |  |  |  |  |
| A : | −.721808E−01 | B :0.127341E+00 | C :−.115312E+00 | D :0.513439E−01 |  |
| 5: | 2.47785 | 0.233243 |  |  |  |
| K : | −1.580581 |  |  |  |  |
| A : | −.612898E−01 | B :0.106444E+00 | C :−.111043E+00 | D :0.372837E−01 |  |
| STO: | 5.68257 | 0.300000 | 639800.232654 |  |  |
| K : | 14.783170 |  |  |  |  |
| A : | −.125705E+00 | B :0.455260E−01 | C :−.127574E+00 | D :0.148882E−01 |  |
| E : | 0.161037E−01 |  |  |  |  |
| 7: | 4.22196 | 0.125354 |  |  |  |
| K : | −0.495908 |  |  |  |  |
| A : | −.112094E+00 | B :0.255794E−01 | C :0.191646E−01 | D :−.774003E−01 |  |
| E : | 0.538266E−01 |  |  |  |  |
| 8: | 23.06273 | 0.466481 | 544100.560927 |  |  |
| K : | −19.981067 |  |  |  |  |
| A : | −.968308E−01 | B :0.356174E−02 | C :0.449903E−01 | D :0.140305E−01 |  |
| E : | −.121725E−01 |  |  |  |  |
| 9: | −4.48551 | 0.486977 |  |  |  |
| K : | 9.601038 |  |  |  |  |
| A : | −.344295E−01 | B :−.639030E−01 | C :0.629761E−01 |  |  |
| 10: | −2.72559 | 0.330000 | 639800.232654 |  |  |
| K : | −10.334219 |  |  |  |  |
| A : | 0.254404E+00 | B :−.537474E+00 | C :0.710892E+00 | D :−.750201E+00 |  |
| E : | 0.508045E+00 | F :−.188919E+00 | G :0.287125E−01 | H |  |
| 11: | −3.29995 | 0.060000 |  |  |  |
| K : | 2.074729 |  |  |  |  |
| A : | 0.321433E−01 | B :0.182999E+00 | C :−.471942E+00 | D :0.582323E+00 |  |
| E : | −.475810E+00 | F :0.263922E+00 | G :−.937304E−01 | H :0.189017E−01 |  |
| J : | −.162718E−02 |  |  |  |  |
| 12: | 2.22201 | 0.888252 | 544100.560927 |  |  |
| K : | −37.302695 |  |  |  |  |
| A : | −.160461E+00 | B :0.591695E−01 | C :−.217720E−01 | D :0.631320E−02 |  |
| E : | −.702890E−03 |  |  |  |  |
| 13: | 1.47763 | 0.265562 |  |  |  |
| K : | −8.218175 |  |  |  |  |
| A : | −.528634E−01 | B :0.471189E−02 | C :0.476749E−02 | D :−.354329E−02 |  |
| E : | 0.118371E−02 | F :−.235338E−03 | G :0.280888E−04 | H :−.183834E−05 |  |
| J : | 0.507907E−07 |  |  |  |  |
| 14: | INFINITY | 0.210000 | 516798.641983 |  |  |
| 15: | INFINITY | 0.633931 |  |  |  |
| IMG: | INFINITY | 0.030000 |  |  |  |

FIG. 28

|  | RADIUS OF CURVATURE | THICKNESS OR DISTANCE | GLA | | | | |
|---|---|---|---|---|---|---|---|
| OBJ: | INFINITY | INFINITY | | | | | |
| 1: | INFINITY | 0.000000 | | | | | |
| STO: | 1.65466 | 0.755779 | 544100.560927 | | | | |
| K : | -0.086567 | | | | | | |
| A :0.426448E-02 | | B :-.391970E-03 | C :0.431130E-02 | | D :-.226884E-02 | | |
| 3: | 89.41973 | 0.081993 | | | | | |
| K : | -15.193302 | | | | | | |
| A :-.202952E-01 | | B :0.492485E-01 | C :-.475194E-01 | | D :0.183076E-01 | | |
| 4: | 14.50660 | 0.230000 | 639800.232654 | | | | |
| K : | 2.649704 | | | | | | |
| A :-.617489E-01 | | B :0.110183E+00 | C :-.975004E-01 | | D :0.448697E-01 | | |
| 5: | 2.92769 | 0.264347 | | | | | |
| K : | -0.630136 | | | | | | |
| A :-.493161E-01 | | B :0.696430E-01 | C :-.666808E-01 | | D :0.220941E-01 | | |
| 6: | 8.15151 | 0.300000 | 639800.232654 | | | | |
| K : | 14.783170 | | | | | | |
| A :-.991307E-01 | | B :-.437838E-01 | C :0.457367E-01 | | D :-.135435E+00 | | |
| E :0.770522E-01 | | | | | | | |
| 7: | 5.14164 | 0.123556 | | | | | |
| K : | -0.495908 | | | | | | |
| A :-.937520E-01 | | B :-.658350E-02 | C :0.378622E-01 | | D :-.517896E-01 | | |
| E :0.366715E-01 | | | | | | | |
| 8: | 64.29915 | 0.449129 | 544100.560927 | | | | |
| K : | -19.981067 | | | | | | |
| A :-.855348E-01 | | B :-.787714E-02 | C :0.583091E-01 | | D :-.217100E-02 | | |
| E :-.526739E-02 | | | | | | | |
| 9: | -4.55591 | 0.571530 | | | | | |
| K : | 8.923958 | | | | | | |
| A :-.448526E-01 | | B :-.308766E-01 | C :0.417659E-01 | | D :0.000000E+00 | | |
| 10: | -3.23573 | 0.300000 | 639800.232654 | | | | |
| K : | -10.334219 | | | | | | |
| A :0.195701E+00 | | B :-.434001E+00 | C :0.547840E+00 | | D :-.544461E+00 | | |
| E :0.344170E+00 | | F :-.122345E+00 | G :0.183526E-01 | | | | |
| 11: | -3.40604 | 0.060000 | | | | | |
| K : | 2.620740 | | | | | | |
| A :0.894580E-01 | | B :-.154966E+00 | C :0.209844E+00 | | D :-.224706E+00 | | |
| E :0.142267E+00 | | F :-.485537E-01 | G :0.652649E-02 | | H :0.497004E-03 | | |
| J :-.153914E-03 | | | | | | | |
| 12: | 3.56740 | 0.997184 | 544100.560927 | | | | |
| K : | -37.302693 | | | | | | |
| A :-.221019E+00 | | B :0.114949E+00 | C :-.409886E-01 | | D :0.791937E-02 | | |
| E :-.534901E-03 | | | | | | | |
| 13: | 1.70688 | 0.254529 | | | | | |
| K : | -8.218200 | | | | | | |
| A :-.522018E-01 | | B :0.658467E-02 | C :0.503914E-02 | | D :-.413592E-02 | | |
| E :0.147405E-02 | | F :-.307753E-03 | G :0.381671E-04 | | H :-.259553E-05 | | |
| J :0.745123E-07 | | | | | | | |
| > 14: | INFINITY | 0.210000 | 516798.641983 | | | | |
| 15: | INFINITY | 0.599533 | | | | | |
| IMG: | INFINITY | 0.000055 | | | | | |

FIG. 32

LENS MODULE

CROSS-REFERENCE TO RELATED APPLICATIONS

This application claims the benefit of Korean Patent Application No. 10-2013-0124456 filed on Oct. 18, 2013, with the Korean Intellectual Property Office, the disclosure of which is incorporated in its entirety herein by reference.

BACKGROUND

The present disclosure relates to a lens module having an optical system including six lenses.

Generally, a camera for a portable terminal includes a lens module and an imaging device.

Here, the lens module includes a plurality of lenses and includes an optical system configured using the plurality of lenses and projecting an image of a subject onto an imaging device. Here, the imaging device is commonly a device such as a charge coupled device (CCD), or the like, and generally has a pixel size of 1.4 µm or more.

However, in accordance with a gradual decrease in portable terminal and included camera sizes, a pixel size of the imaging device has been decreased to 1.12 µm or less. Therefore, development of a lens module having a low F No. of 2.3 or less, at which a high resolution may be implemented even under the above-mentioned conditions, has been demanded.

For reference, as the related art associated with the present disclosure, there are provided Patent Documents 1 and 2.

RELATED ART DOCUMENT (Patent Document 1) US2012-0243108 A1
(Patent Document 2) US2012-0314301 A1

SUMMARY

An aspect of the present disclosure may provide a lens module capable of implementing an optical system having a low F No. of 2.3 or less.

According to an aspect of the present disclosure, a lens module may include: a first lens having positive refractive power; a second lens having negative refractive power; a third lens having negative refractive power; a fourth lens having refractive power; a fifth lens having negative refractive power and having a shape in which an image-side surface thereof is convex; and a sixth lens having refractive power, having a shape in which an image-side surface thereof is concave, and having at least one point of inflection formed on the image-side surface thereof.

The first lens may have a shape in which an imaging object-side surface thereof is convex.

The second lens may have a shape in which an image-side surface thereof is concave.

The fifth lens may have a shape in which an imaging object-side surface thereof is concave and the image-side surface thereof is convex.

The sixth lens may have a shape in which an imaging object-side surface thereof is convex.

An optical system including the first to sixth lenses may satisfy Conditional Equation 1:

$$TTL/IMGH<2.0 \quad \text{[Conditional Equation 1]}$$

where TTL may indicate a distance [mm] from an imaging object-side surface of the first lens to an imaging surface and IMGH may indicate a diagonal distance [mm] of the imaging surface of an image sensor.

An optical system including the first to sixth lenses may satisfy Conditional Equation 2:

$$0.7<SL/TTL<1.1 \quad \text{[Conditional Equation 2]}$$

where SL may indicate a distance from a stop to an imaging surface and TTL may indicate a distance [mm] from an imaging object-side surface of the first lens to the imaging surface.

An optical system including the first to sixth lenses may satisfy Conditional Equation 3:

$$ANG/F\ No.>34 \quad \text{[Conditional Equation 3]}$$

where ANG may indicate a field of view of the optical system and F No. may indicate a numerical value indicating brightness of the optical system.

An optical system including the first to sixth lenses may satisfy Conditional Equation 4:

$$F\ No.<2.4 \quad \text{[Conditional Equation 4]}$$

where F No. may indicate a numerical value indicating brightness of the optical system.

An optical system including the first to sixth lenses may satisfy Conditional Equation 5:

$$|f5/f1|>9.0 \quad \text{[Conditional Equation 5]}$$

where f5 may indicate a focal length [mm] of the fifth lens and f1 may indicate a focal length [mm] of the first lens.

According to another aspect of the present disclosure, a lens module may include: a first lens having positive refractive power; a second lens having refractive power and having a shape in which an image-side surface thereof is concave; a third lens having negative refractive power; a fourth lens having refractive power; a fifth lens having negative refractive power and having a shape in which an imaging object-side surface thereof is concave; and a sixth lens having refractive power, having a shape in which an image-side surface thereof is concave, and having at least one point of inflection formed on the image-side surface thereof.

The first lens may have a shape in which an imaging object-side surface thereof is convex.

The second lens may have negative refractive power.

The fifth lens may have a shape in which an image-side surface thereof is convex.

The sixth lens may have a shape in which an imaging object-side surface thereof is convex.

An optical system including the first to sixth lenses may satisfy Conditional Equation 1:

$$TTL/IMGH<2.0 \quad \text{[Conditional Equation 1]}$$

where TTL may indicate a distance [mm] from an imaging object-side surface of the first lens to an imaging surface and IMGH may indicate a diagonal distance [mm] of the imaging surface of an image sensor.

An optical system including the first to sixth lenses may satisfy Conditional Equation 2:

$$0.7<SL/TTL<1.1 \quad \text{[Conditional Equation 2]}$$

where SL may indicate a distance from a stop to an imaging surface and TTL may indicate a distance [mm] from an imaging object-side surface of the first lens to the imaging surface.

An optical system including the first to sixth lenses may satisfy Conditional Equation 3:

$$ANG/F\ No.>34 \quad \text{[Conditional Equation 3]}$$

where ANG may indicate a field of view of the optical system and F No. may indicate a numerical value indicating brightness of the optical system.

An optical system including the first to sixth lenses may satisfy Conditional Equation 4:

$$F\,No.<2.4 \qquad \text{[Conditional Equation 4]}$$

where F No. may indicate a numerical value indicating brightness of the optical system.

An optical system including the first to sixth lenses may satisfy Conditional Equation 5:

$$|f5/f1|>9.0 \qquad \text{[Conditional Equation 5]}$$

where f5 may indicate a focal length [mm] of the fifth lens and f1 may indicate a focal length [mm] of the first lens.

According to another aspect of the present disclosure, a lens module may include: a first lens having positive refractive power; a second lens having negative refractive power; a third lens having negative refractive power; a fourth lens having positive refractive power; a fifth lens having negative refractive power; and a sixth lens having negative refractive power and having at least one point of inflection formed on an image-side surface thereof, wherein an optical system including the first to sixth lenses satisfies the following Conditional Equation:

$$ANG/F\,No.>34 \qquad \text{[Conditional Equation]}$$

where ANG indicates a field of view of the optical system and F No. indicates a numerical value indicating brightness of the optical system.

The first lens may have a shape in which an imaging object-side surface thereof is convex.

The second lens may have a shape in which an image-side surface thereof is concave.

The third lens may have a shape in which an image-side surface thereof is concave.

The fifth lens may have a shape in which an imaging object-side surface thereof is concave.

The fifth lens may have a shape in which an image-side surface thereof is convex.

The sixth lens may have a shape in which an imaging object-side surface thereof is convex and the image-side surface thereof is concave.

The optical system including the first to sixth lenses may satisfy the following Conditional Equation:

$$TTL/IMGH<2.0 \qquad \text{[Conditional Equation]}$$

where TTL may indicate a distance [mm] from an imaging object-side surface of the first lens to an imaging surface and IMGH may indicate a diagonal distance [mm] of the imaging surface of an image sensor.

The optical system including the first to sixth lenses may satisfy the following Conditional Equation:

$$0.7<SL/TTL<1.1 \qquad \text{[Conditional Equation]}$$

where SL may indicate a distance from a stop to an imaging surface and TTL may indicate a distance [mm] from an imaging object-side surface of the first lens to the imaging surface.

The optical system including the first to sixth lenses may satisfy the following Conditional Equation:

$$F\,No.<2.3 \qquad \text{[Conditional Equation]}$$

where F No. may indicate a numerical value indicating brightness of the optical system.

The optical system including the first to sixth lenses may satisfy the following Conditional Equation:

$$|f5/f1|>9.0 \qquad \text{[Conditional Equation]}$$

where f5 may indicate a focal length [mm] of the fifth lens and f1 may indicate a focal length [mm] of the first lens.

BRIEF DESCRIPTION OF DRAWINGS

The above and other aspects, features and other advantages of the present disclosure will be more clearly understood from the following detailed description taken in conjunction with the accompanying drawings, in which:

FIG. 4 is a table illustrating physical optical properties of the lens module shown in FIG. 1;

FIG. 8 is a table illustrating physical optical properties of the lens module shown in FIG. 5;

FIG. 12 is a table illustrating physical optical properties of the lens module shown in FIG. 9;

FIG. 16 is a table illustrating physical optical properties of the lens module shown in FIG. 13;

FIG. 20 is a table illustrating physical optical properties of the lens module shown in FIG. 17;

FIG. 24 is a table illustrating physical optical properties of the lens module shown in FIG. 21;

FIG. 28 is a table illustrating physical optical properties of the lens module shown in FIG. 25;

FIG. 32 is a table illustrating physical optical properties of the lens module shown in FIG. 29.

DETAILED DESCRIPTION

Figure 1:
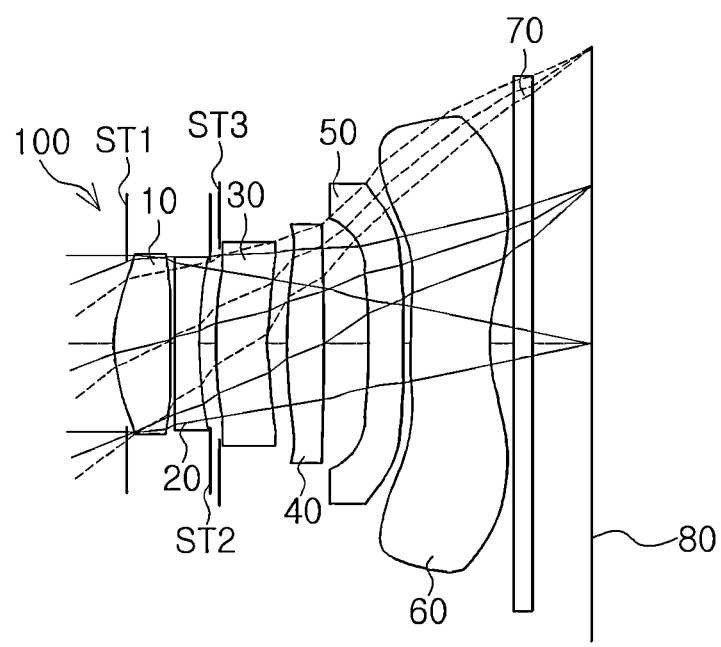
FIG. 1 is a configuration diagram of a lens module according to an exemplary embodiment of the present disclosure.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

In addition, in the present specification, a first lens refers to a lens closest to an imaging object side, and a sixth lens refers to a lens closest to an image side. Further, a front side refers to a side of a lens module toward the imaging object side, and a rear side refers to a side of the lens module toward the image sensor. In addition, a first surface of each lens refers to a surface toward the imaging object side (or an imaging object-side surface), and a second surface of each lens refers to a surface toward the image side (or an image-side surface). Further, in the present specification, all units of measurement of radii, thicknesses, through-the-lens (TTL) distances, stop to an imaging surface distances (SLs), diagonal distances of imaging surfaces (IMGHs), overall focal lengths of the optical system, and focal lengths of each lens may be in mm. Further, in descriptions of lens shapes, a shape in which one surface of the lens is convex may mean that an optical axis portion of a corresponding surface is convex, and a shape in which one surface of the lens is concave may mean that an optical axis portion of a corresponding portion is concave. Therefore, even in the case that a lens is described as having a shape in which one surface thereof is convex, an edge portion of the lens may be concave. Conversely, even in the case that a lens is described as having a shape in which one surface thereof is concave, an edge portion of the lens may be convex.

Figure 2:
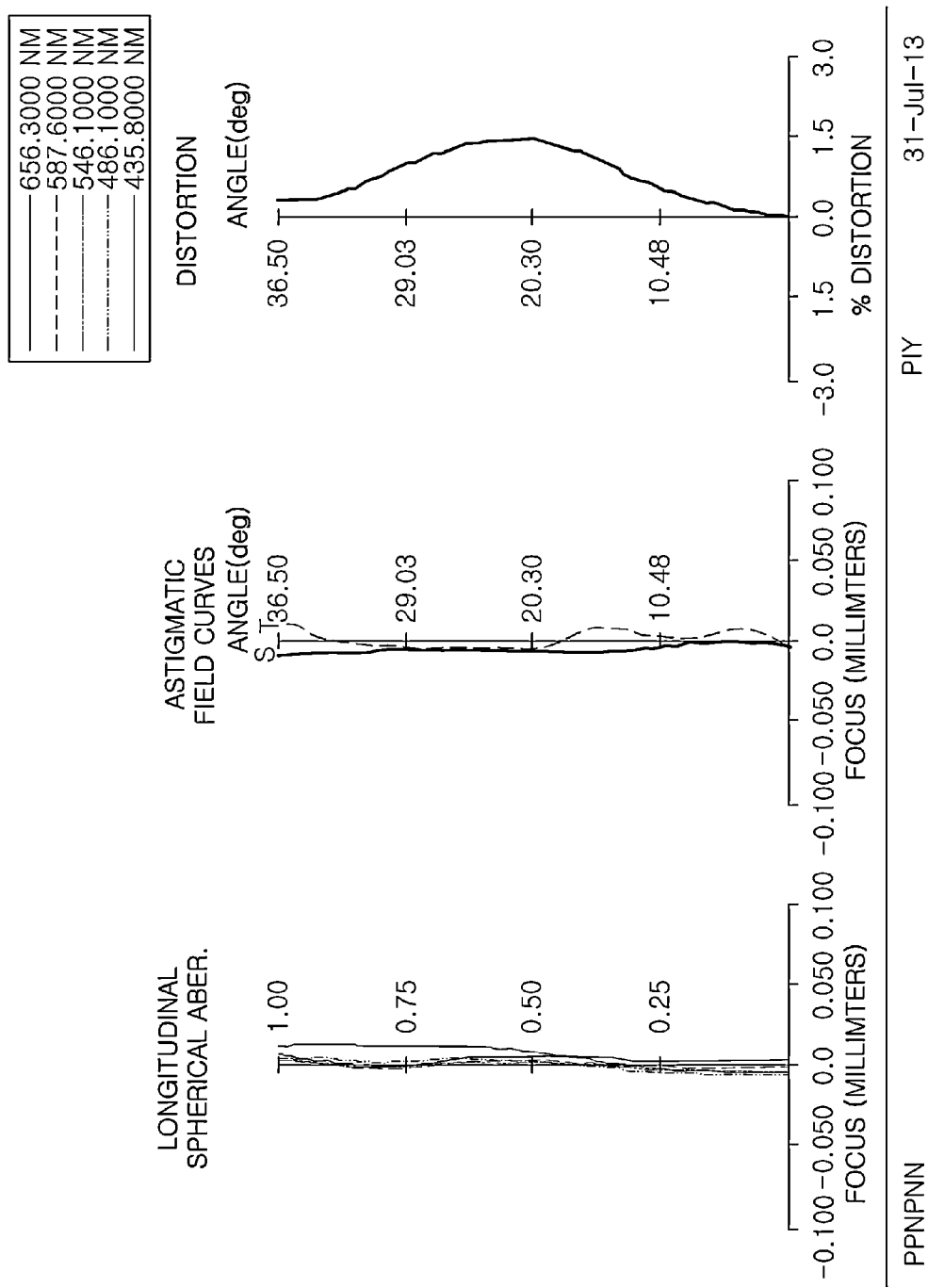
FIGS. 2 and 3 are graphs containing curves illustrating aberration characteristics of the lens module shown in FIG. 1.
Figure 3:
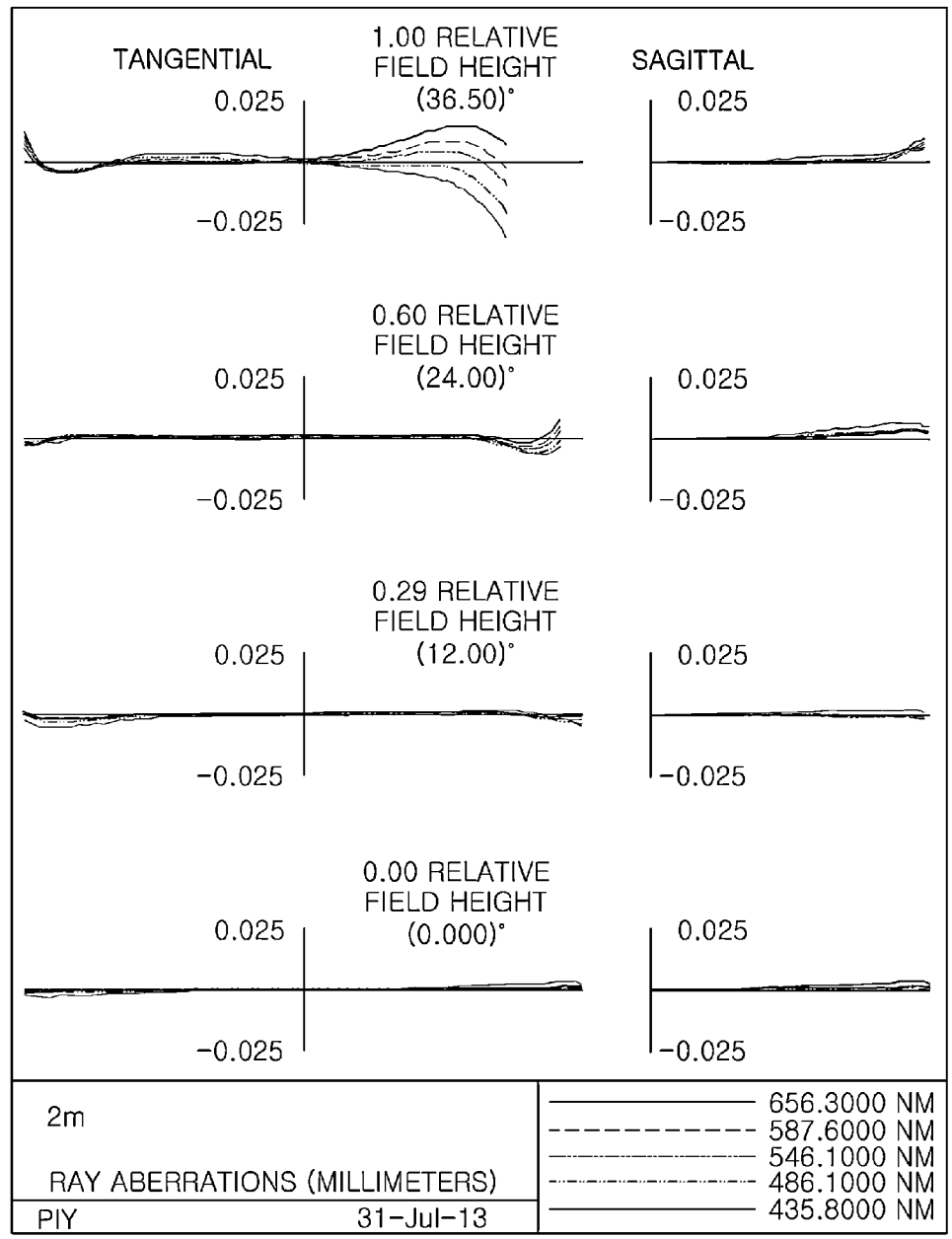
Figure 5:
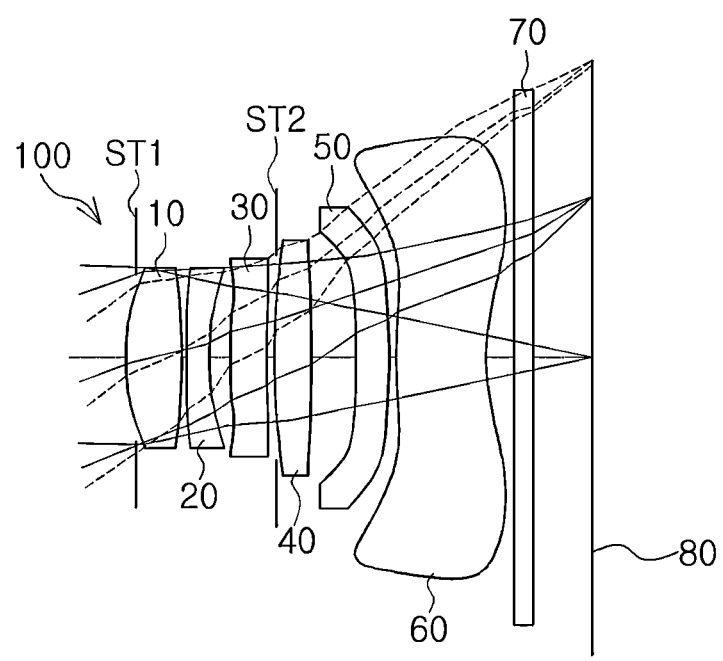
FIG. 5 is a configuration diagram of a lens module according to another exemplary embodiment of the present disclosure.
Figure 6:
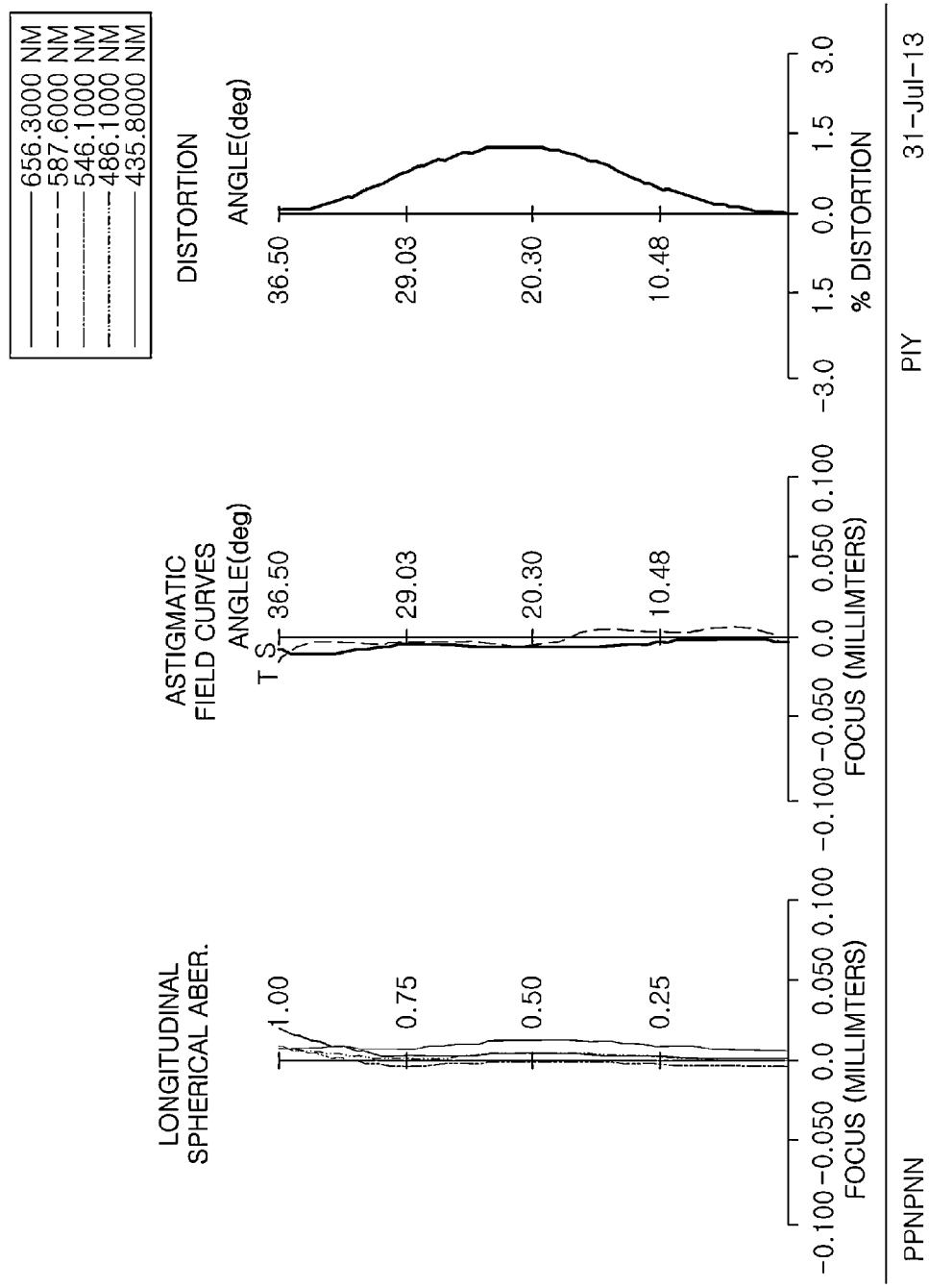
FIGS. 6 and 7 are graphs containing curves illustrating aberration characteristics of the lens module shown in FIG. 5.
Figure 7:
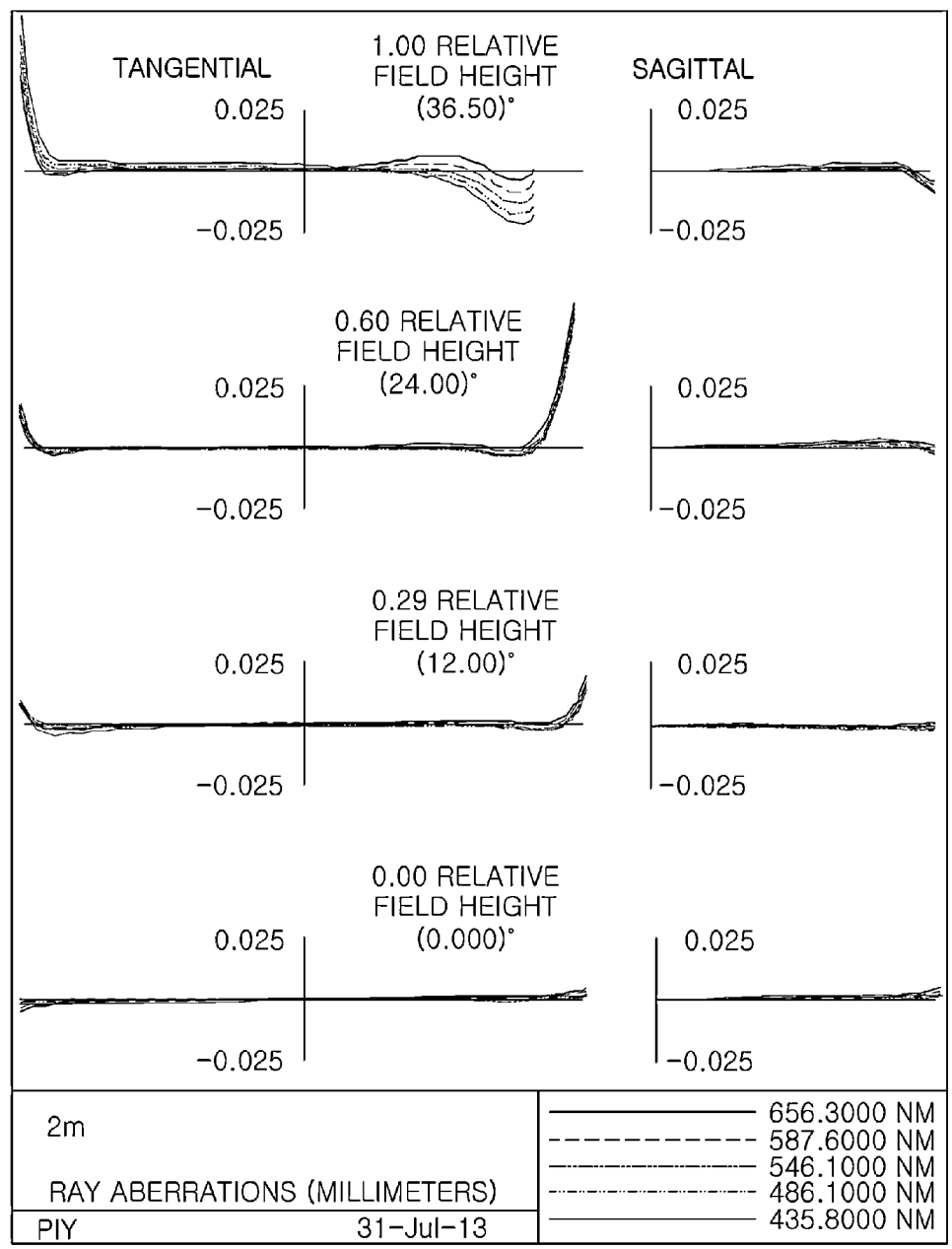
Figure 9:
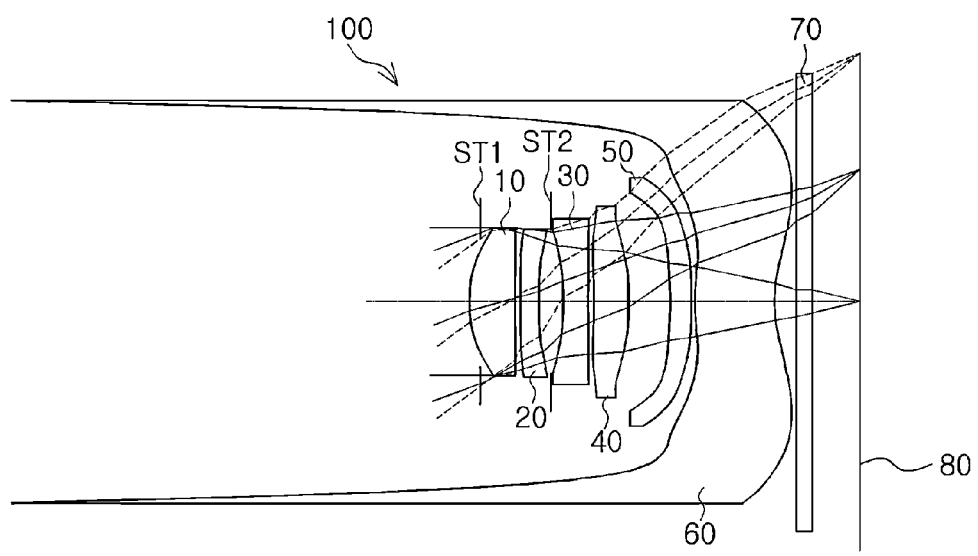
FIG. 9 is a configuration diagram of a lens module according to another exemplary embodiment of the present disclosure.
Figure 10:
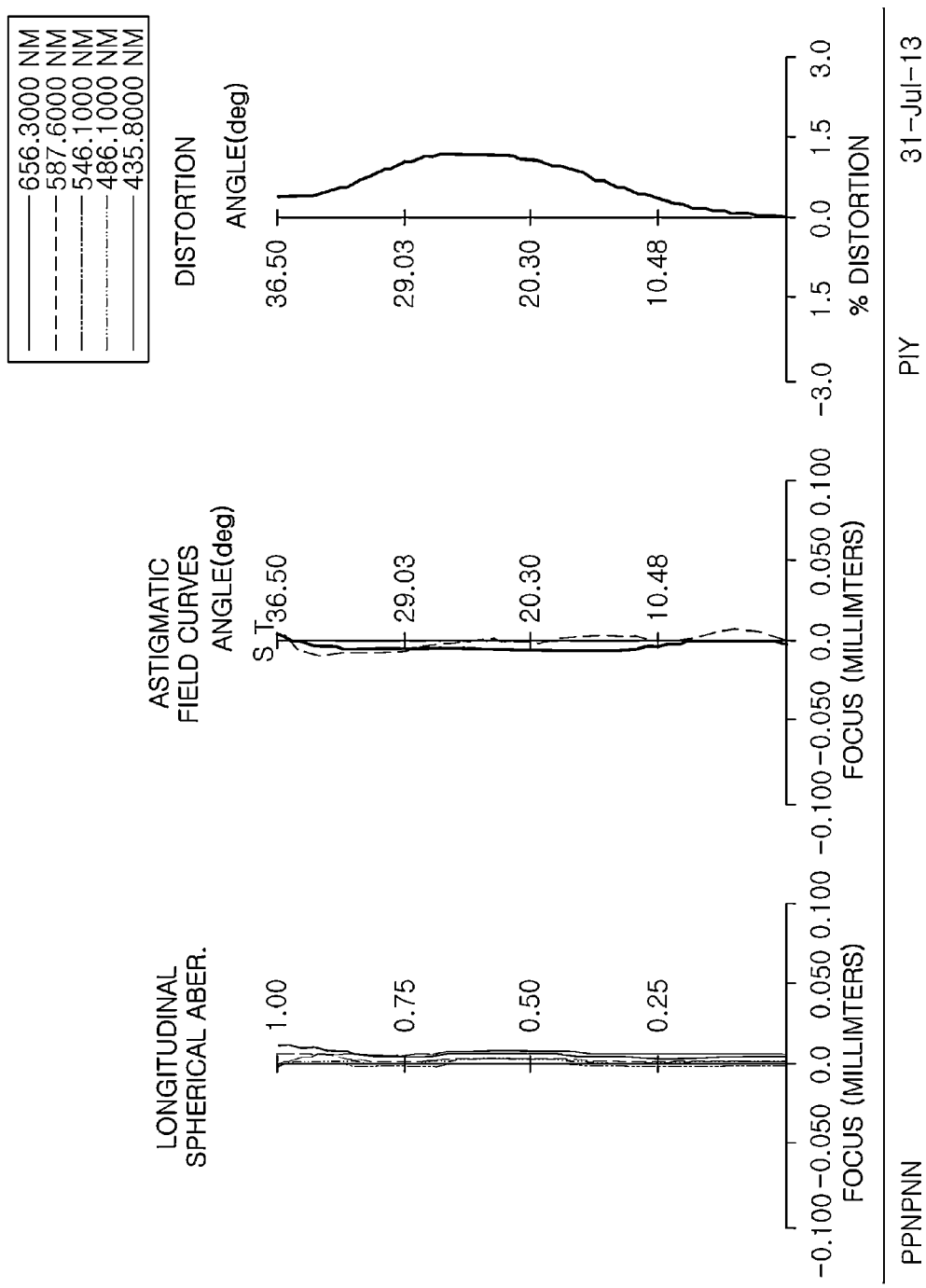
FIGS. 10 and 11 are graphs containing curves illustrating aberration characteristics of the lens module shown in FIG. 9.
Figure 11:
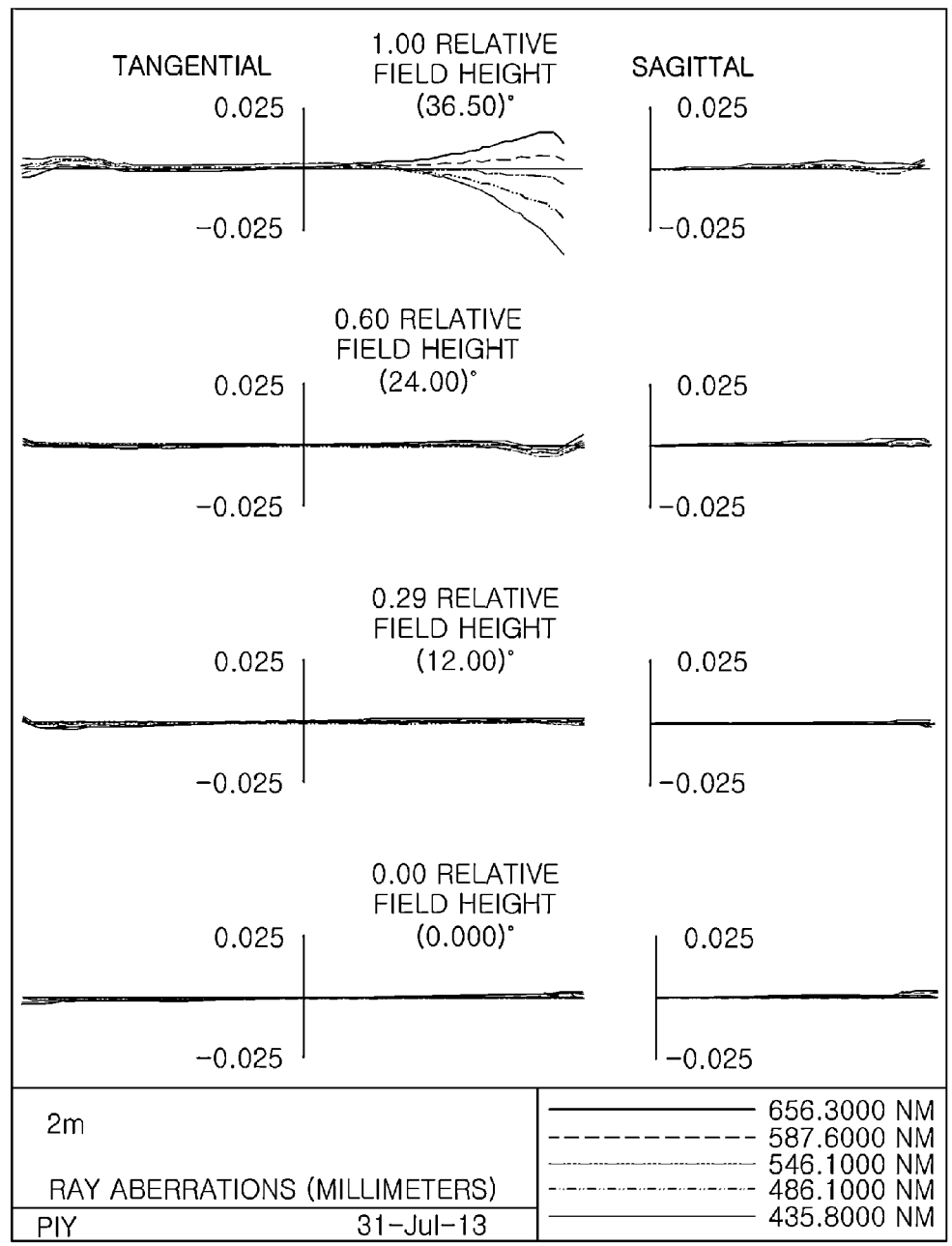
Figure 13:
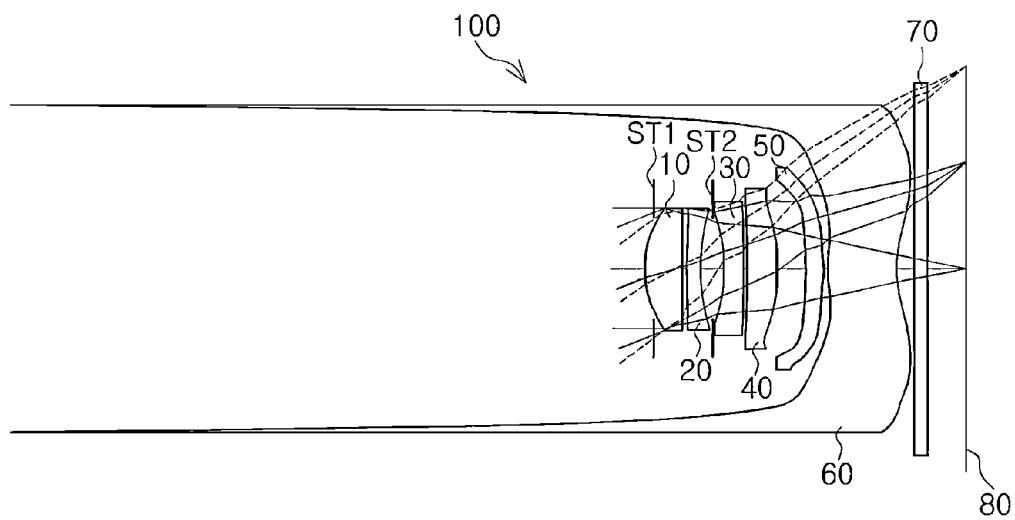
FIG. 13 is a configuration diagram of a lens module according to another exemplary embodiment of the present disclosure.
Figure 14:
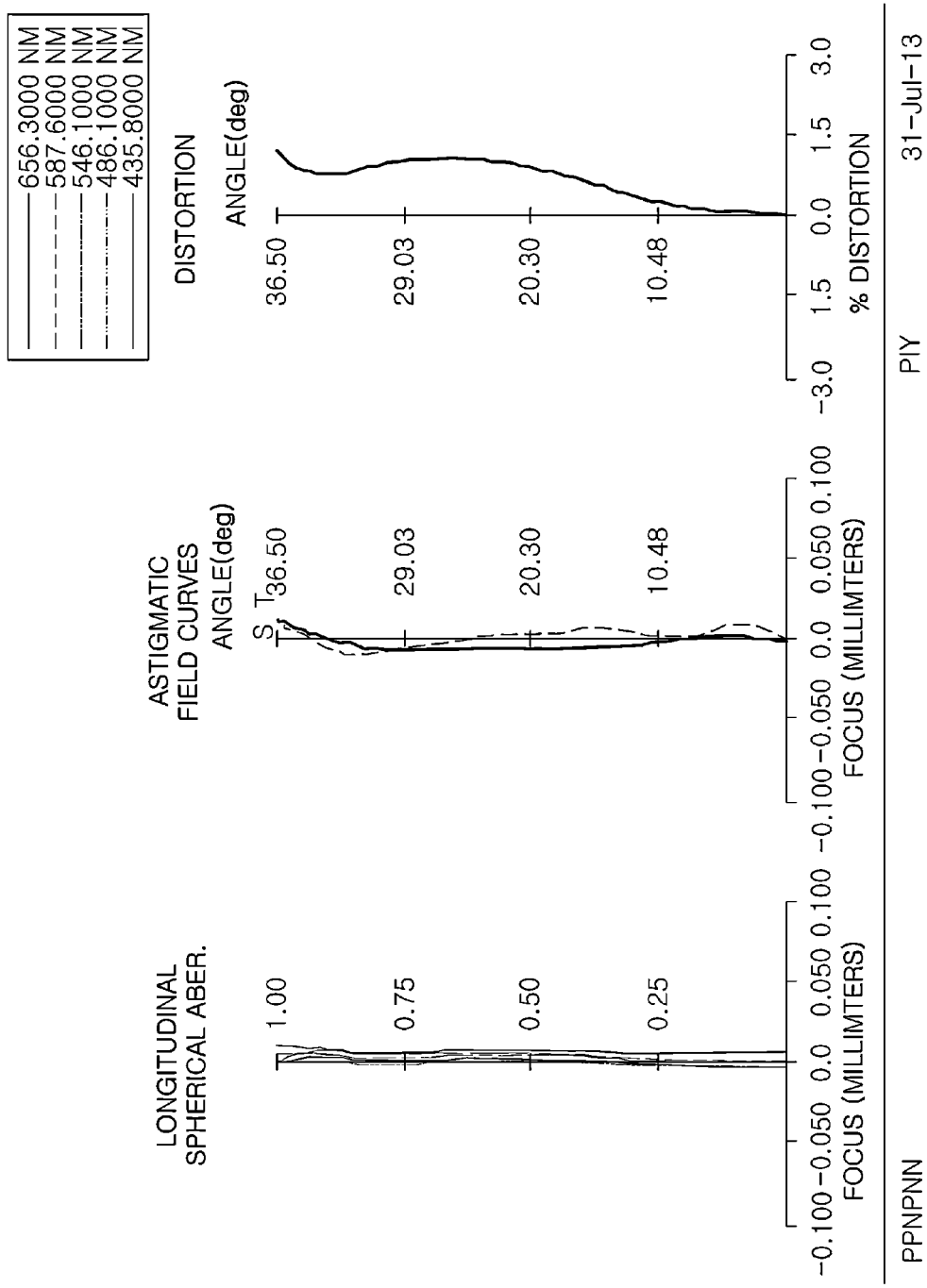
FIGS. 14 and 15 are graphs containing curves illustrating aberration characteristics of the lens module shown in FIG. 13.
Figure 15:
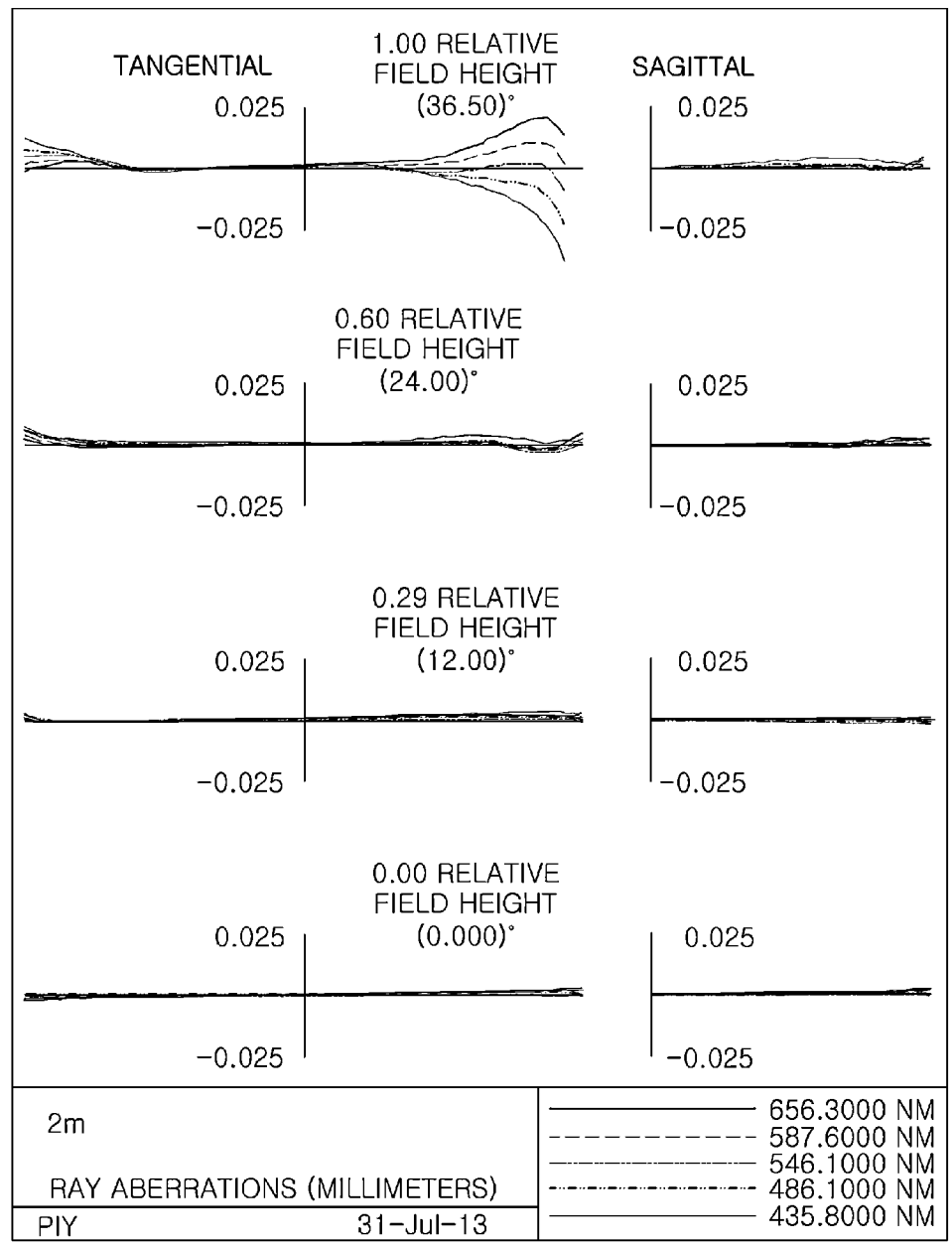
Figure 17:
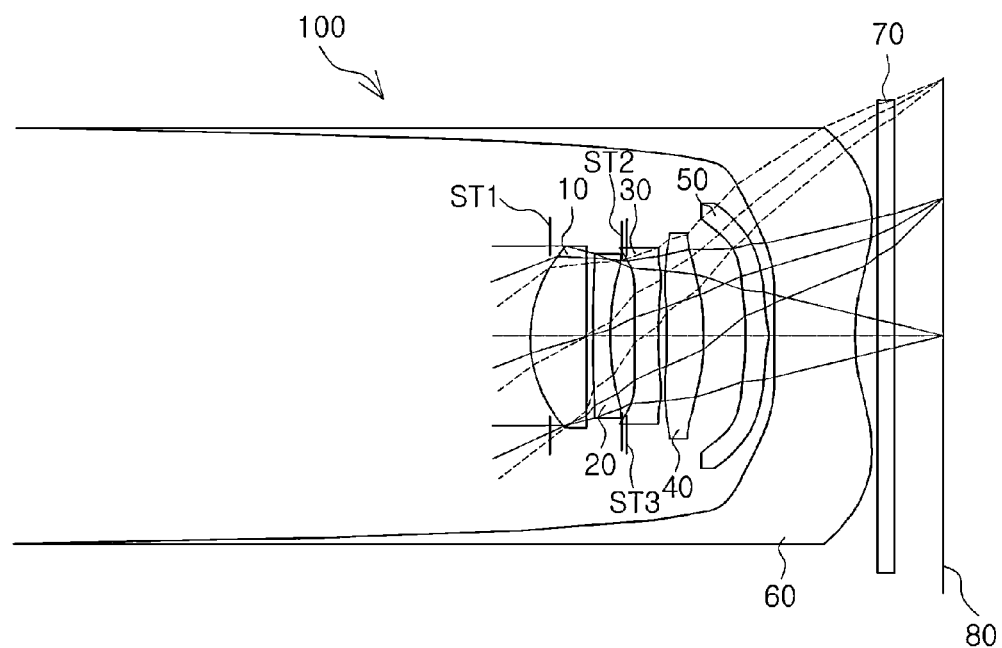
FIG. 17 is a configuration diagram of a lens module according to another exemplary embodiment of the present disclosure.
Figure 18:
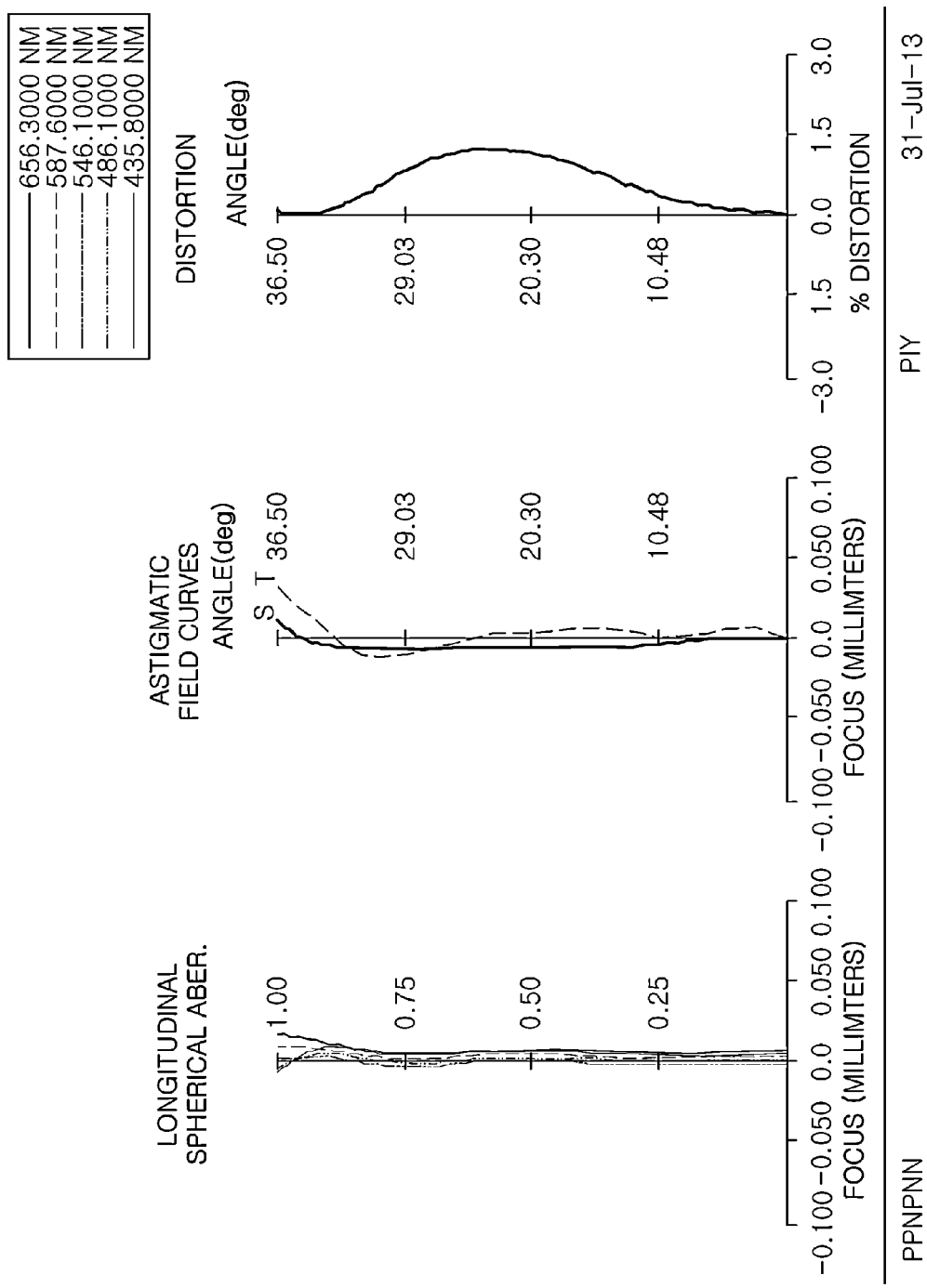
FIGS. 18 and 19 are graphs containing curves illustrating aberration characteristics of the lens module shown in FIG. 17.
Figure 19:
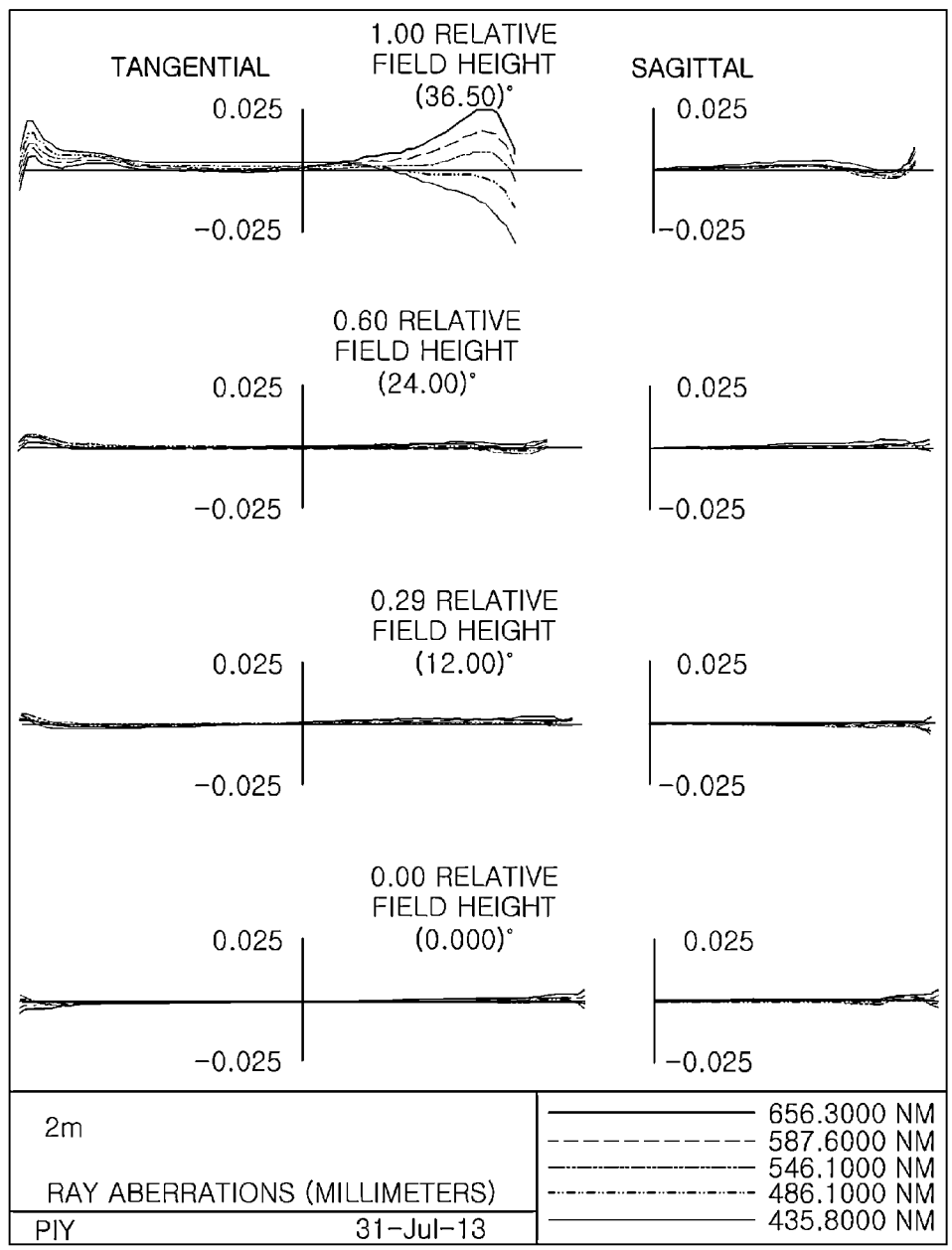
Figure 21:
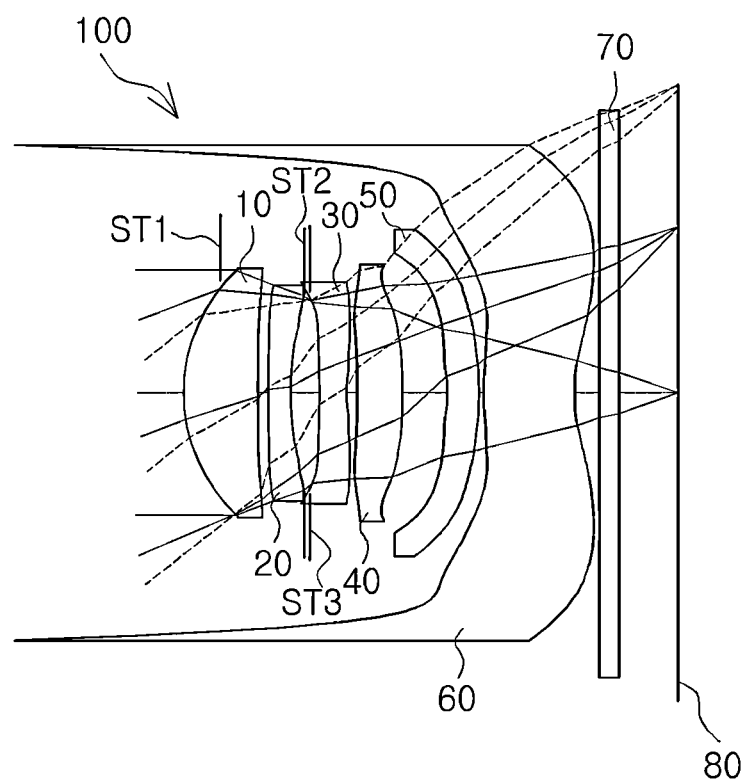
FIG. 21 is a configuration diagram of a lens module according to another exemplary embodiment of the present disclosure.
Figure 22:
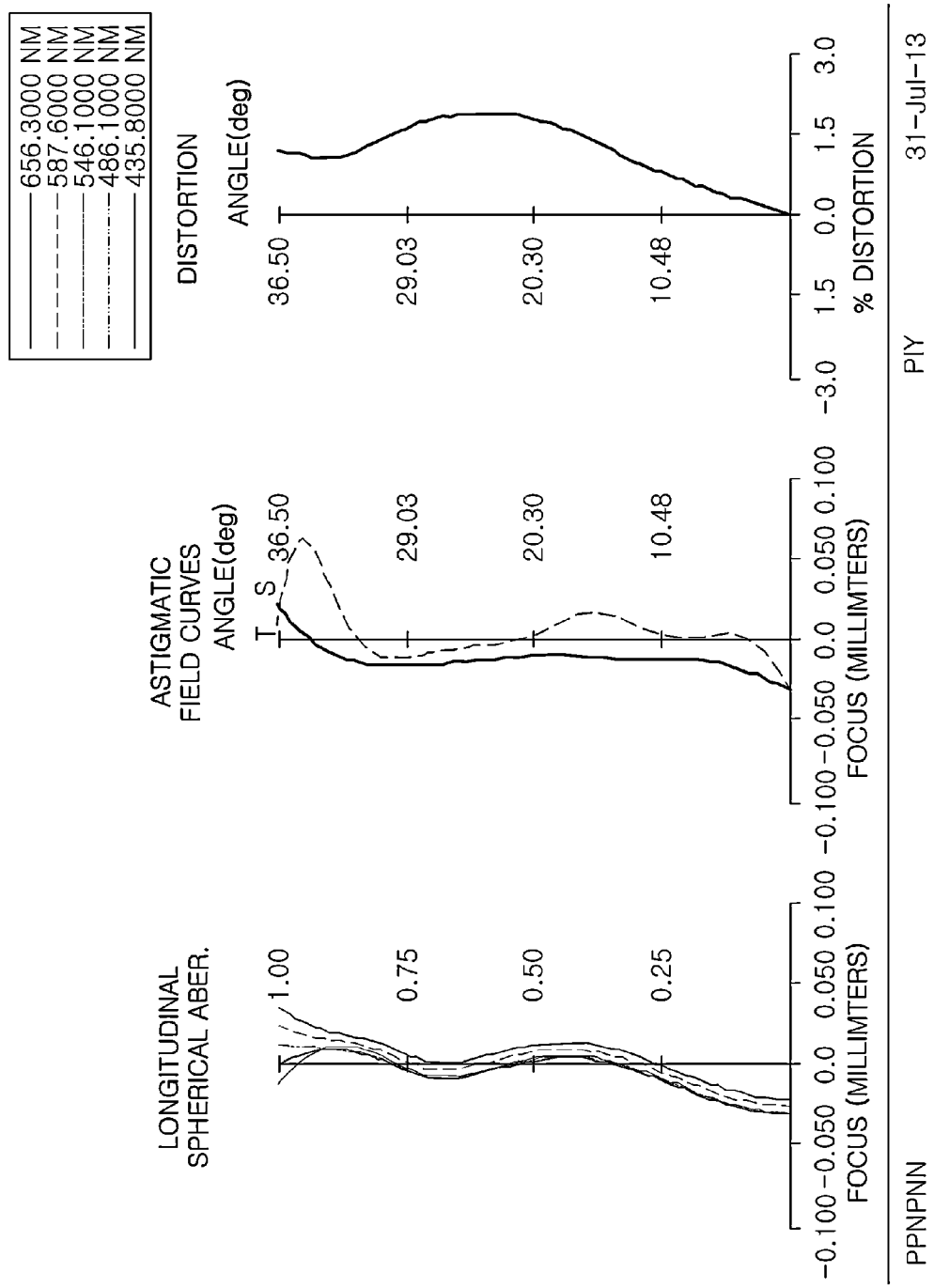
FIGS. 22 and 23 are graphs containing curves illustrating aberration characteristics of the lens module shown in FIG. 21.
Figure 23:
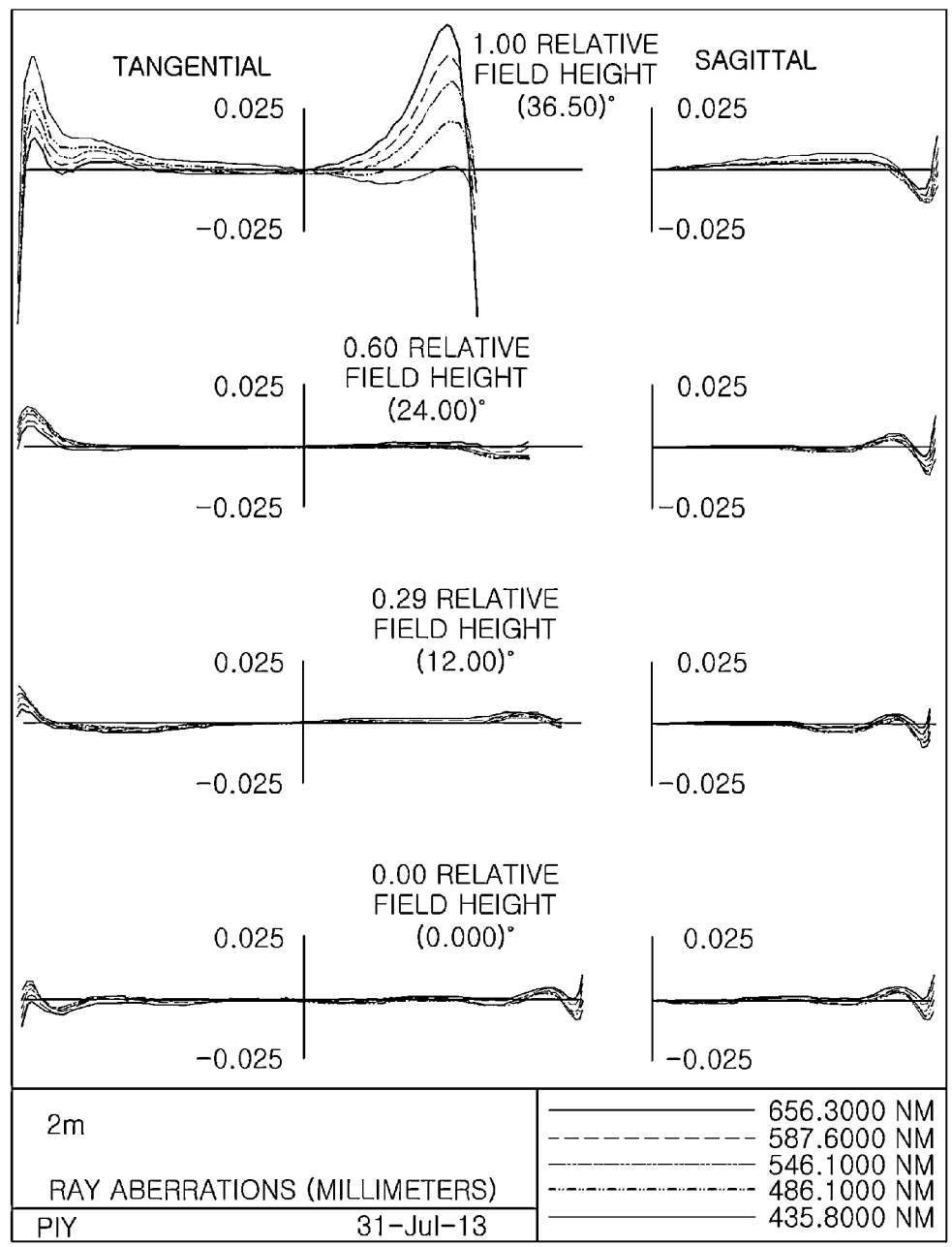
Figure 25:
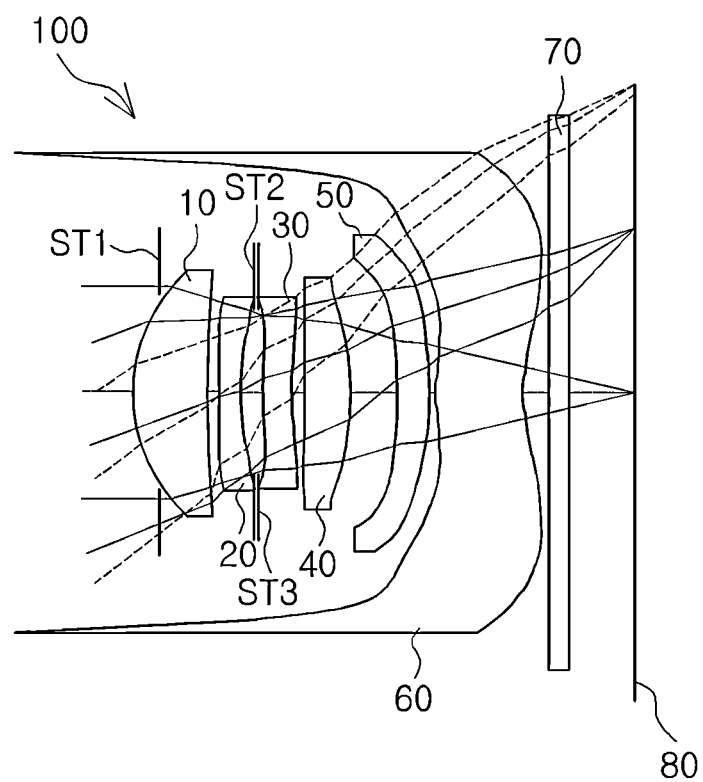
FIG. 25 is a configuration diagram of a lens module according to another exemplary embodiment of the present disclosure.
Figure 26:
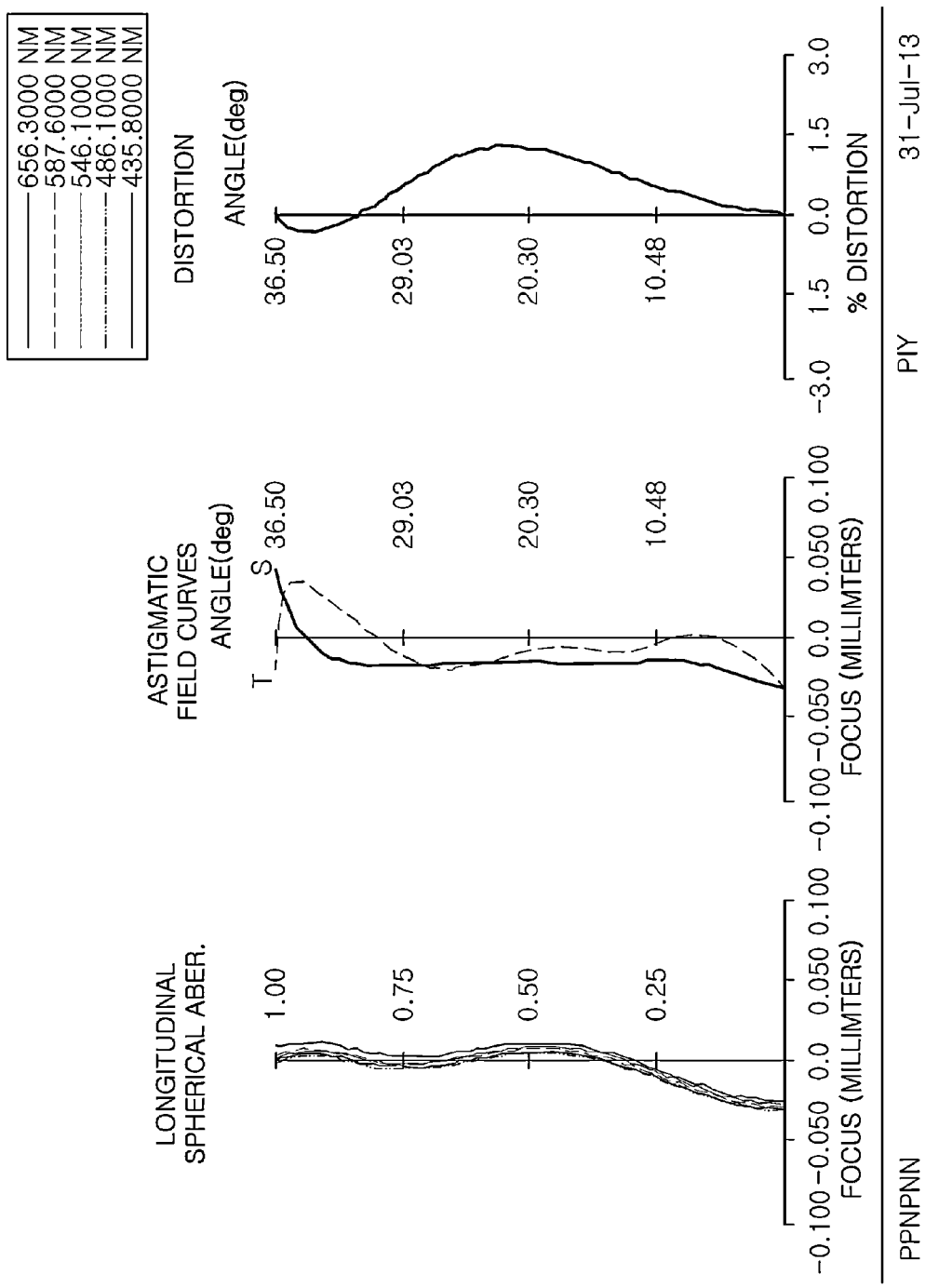
FIGS. 26 and 27 are graphs containing curves illustrating aberration characteristics of the lens module shown in FIG. 25.
Figure 27:
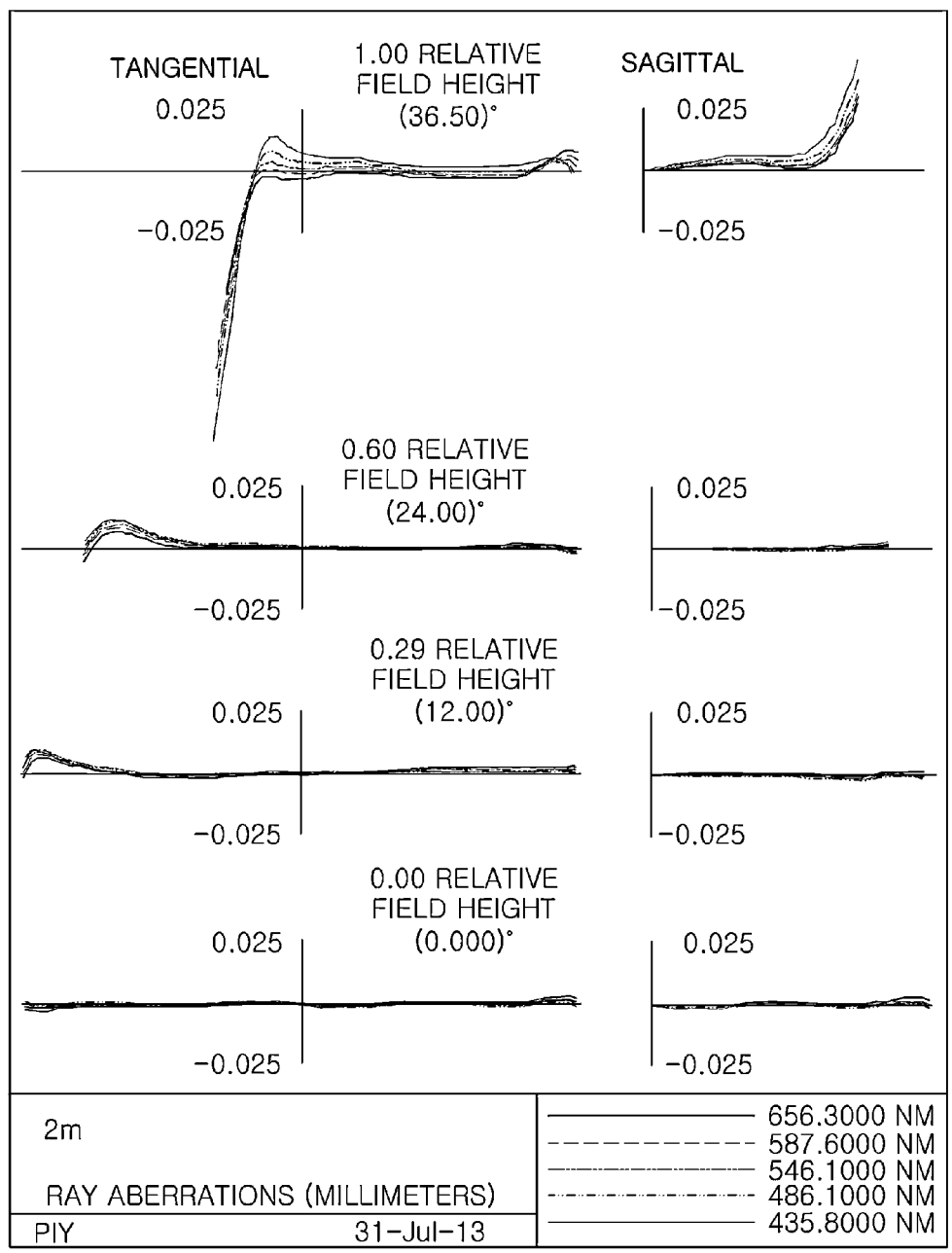
Figure 29:
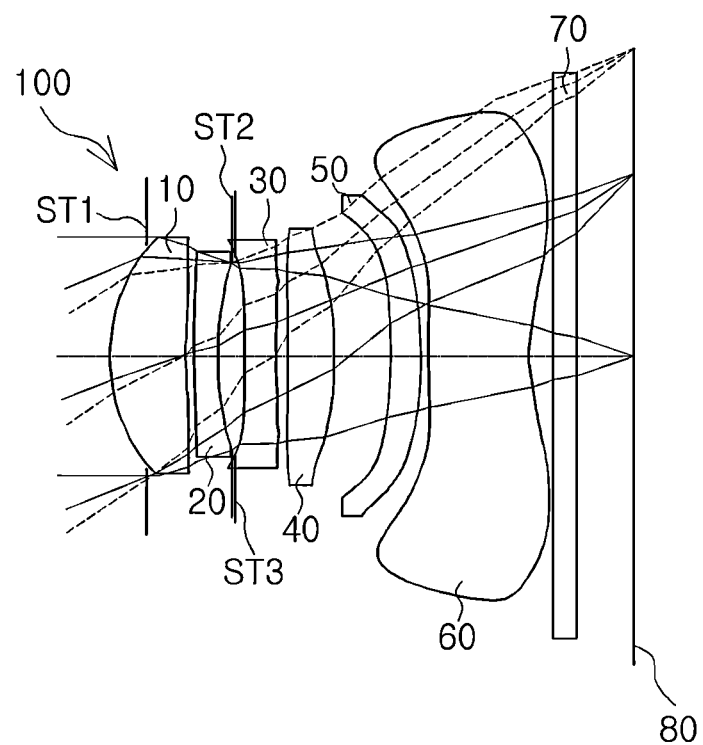
FIG. 29 is a configuration diagram of a lens module according to another exemplary embodiment of the present disclosure.
Figure 30:
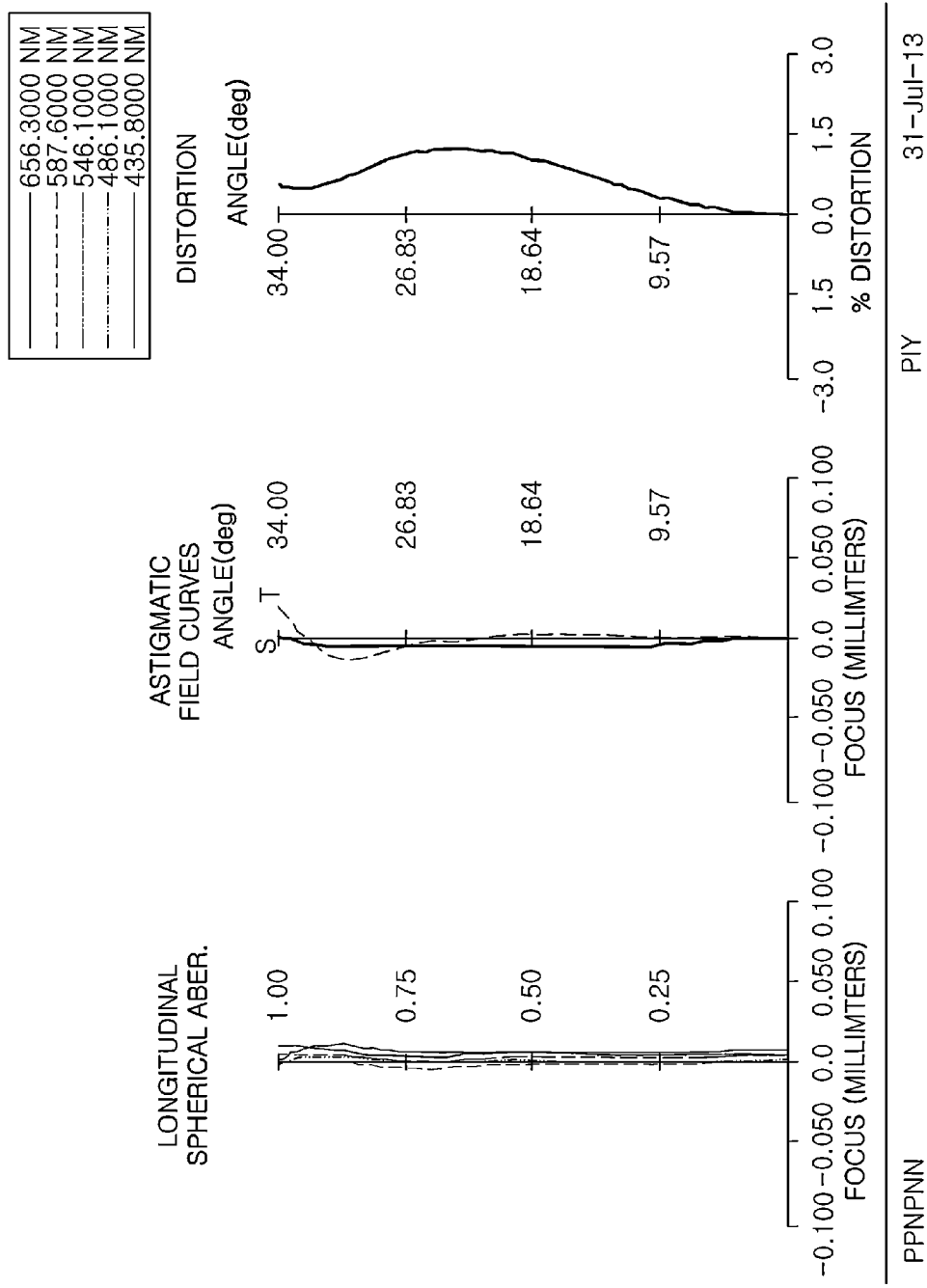
FIGS. 30 and 31 are graphs containing curves illustrating aberration characteristics of the lens module shown in FIG. 29.
Figure 31:
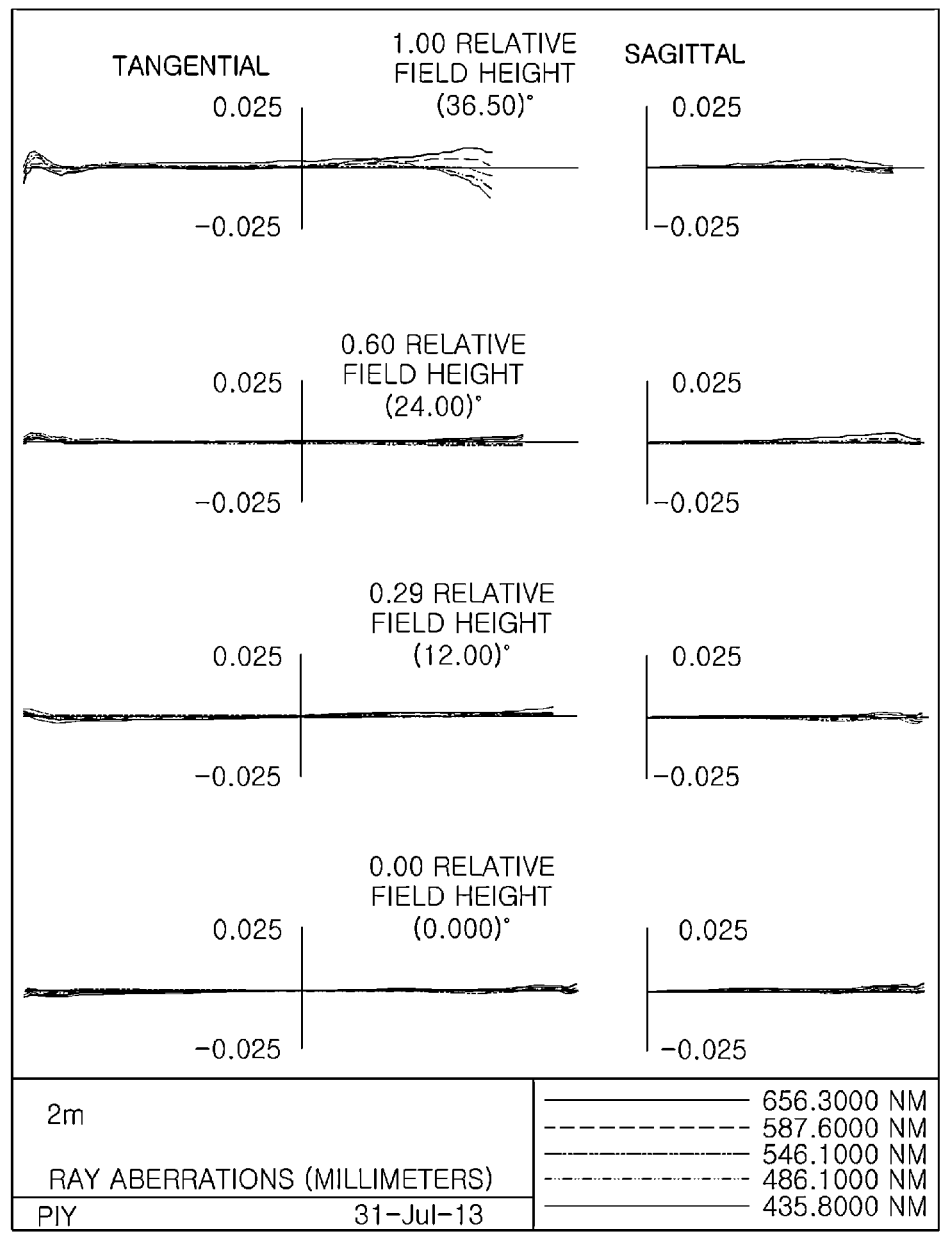

FIG. 1 is a configuration diagram of a lens module according to an exemplary embodiment of the present disclosure; FIGS. 2 and 3 are graphs containing curves illustrating aberration characteristics of the lens module shown in FIG. 1; FIG. 4 is a table illustrating physical optical properties of the lens module shown in FIG. 1; FIG. 5 is a configuration diagram of a lens module according to another exemplary embodiment of the present disclosure; FIGS. 6 and 7 are graphs containing curves illustrating aberration characteristics of the lens module shown in FIG. 5; FIG. 8 is a table illustrating physical optical properties of the lens module shown in FIG. 5; FIG. 9 is a configuration diagram of a lens module according to another exemplary embodiment of the present disclosure; FIGS. 10 and 11 are graphs containing curves illustrating aberration characteristics of the lens module shown in FIG. 9; FIG. 12 is a table illustrating physical optical properties of the lens module shown in FIG. 9; FIG. 13 is a configuration diagram of a lens module according to another exemplary embodiment of the present disclosure; FIGS. 14 and 15 are graphs containing curves illustrating aberration characteristics of the lens module shown in FIG. 13; FIG. 16 is a table illustrating physical optical properties of the lens module shown in FIG. 13; FIG. 17 is a configuration diagram of a lens module according to another exemplary embodiment of the present disclosure; FIGS. 18 and 19 are graphs containing curves illustrating aberration characteristics of the lens module shown in FIG. 17; FIG. 20 is a table illustrating physical optical properties of the lens module shown in FIG. 17; FIG. 21 is a configuration diagram of a lens module according to another exemplary embodiment of the present disclosure; FIGS. 22 and 23 are graphs containing curves illustrating aberration characteristics of the lens module shown in FIG. 21; FIG. 24 is a table illustrating physical optical properties of the lens module shown in FIG. 21; FIG. 25 is a configuration diagram of a lens module according to another exemplary embodiment of the present disclosure; FIGS. 26 and 27 are graphs containing curves illustrating aberration characteristics of the lens module shown in FIG. 25; FIG. 28 is a table illustrating physical optical properties of the lens module shown in FIG. 25; FIG. 29 is a configuration diagram of a lens module according to another exemplary embodiment of the present disclosure; FIGS. 30 and 31 are graphs containing curves illustrating aberration characteristics of the lens module shown in FIG. 29; and FIG. 32 is a table illustrating physical optical properties of the lens module shown in FIG. 29.

A lens module according to an exemplary embodiment of the present disclosure may include an optical system including six lenses. More specifically, the lens module may include a first lens, a second lens, a third lens, a fourth lens, a fifth lens, and a sixth lens. However, the lens module is not limited to including only six lenses, but may further include other components if necessary. For example, the lens module may include a stop for controlling an amount of light. In addition, the lens module may further include an infrared cut-off filter blocking infrared rays. Further, the lens module may further include an image sensor (that is, an imaging device) converting an image of a subject incident through an optical system into an electrical signal. Further, the lens module may further include an interval maintaining member adjusting an interval between lenses.

The first to sixth lenses configuring the optical system may be formed of a plastic material. In addition, at least one of the first to sixth lenses may have an aspheric surface. Further, the first to sixth lenses may have at least one aspheric surface. That is, at least one of first and second surfaces of the first to sixth lenses may be an aspheric surface.

In addition, the optical system including the first to sixth lenses may have F No. of 2.4 or less. In this case, an image of a subject may be clearly captured. For example, the lens module according to an exemplary embodiment of the present disclosure may clearly capture an image of the subject even under a low illumination conditions (for example, 100 lux or less).

The optical system including the first to sixth lenses may satisfy the following Conditional Equation 1.

$$TTL/IMGH<2.0 \qquad \text{[Conditional Equation 1]}$$

Here TTL may indicate a distance [mm] from an imaging object-side surface of the first lens to an imaging surface and IMGH may indicate a diagonal distance [mm] of the imaging surface (that is, an image sensor).

Here, it may be difficult for a lens module having a value outside of an upper limit value of the above Conditional Equation 1 to be mounted in a portable electronic device since TTL is large.

The optical system including the first to sixth lenses may satisfy the following Conditional Equation 2.

$$0.7<SL/TTL<1.1 \qquad \text{[Conditional Equation 2]}$$

In this case, SL may indicate a distance from the stop to the imaging surface and TTL may indicate a distance [mm] from the imaging object-side surface of the first lens to the imaging surface.

Here, a lens module having a value outside of a lower limit value of the above Conditional Equation 2 may have a problem in terms of an angle at which light is incident from the sixth lens to the imaging surface, since a distance between the stop and the imaging surface is excessively shortened. Conversely, it may be difficult for a lens module having a value outside of an upper limit value of the above Conditional Equation 2 to be miniaturized, since a distance between the stop and the imaging surface may be excessively elongated.

The optical system including the first to sixth lenses may satisfy the following Conditional Equation 3.

$$ANG/F \text{ No.} > 34 \quad \text{[Conditional Equation 3]}$$

Here ANG may indicate a field of view of the optical system and F No. may indicate a numerical value indicating brightness of the optical system.

The optical system including the first to sixth lenses may satisfy the following Conditional Equation 4.

$$F \text{ No.} < 2.4 \quad \text{[Conditional Equation 4]}$$

Here, F No. may indicate a numerical value indicating brightness of the optical system.

Here, the optical system satisfying the above Conditional Equation 4 may capture a clear image even in a low illumination environment.

The optical system including the first to sixth lenses may satisfy the following Conditional Equation 5.

$$|f5/f1| > 9.0 \quad \text{[Conditional Equation 5]}$$

Here, f5 may indicate a focal length [mm] of the fifth lens and f1 may indicate a focal length [mm] of the first lens.

Here, the above Conditional Equation 5 may be a numerical condition limiting the fifth lens. For example, the fifth lens satisfying the above Conditional Equation 5 may have a significantly increased aberration correction effect.

Next, the first to sixth lenses configuring the optical system will be described.

The first lens may have refractive power. For example, the first lens may have positive refractive power. The first lens may have a shape in which a first surface thereof is convex and a second surface thereof is concave. For example, the first lens may have a meniscus shape in which it is convex toward the imaging object. Alternatively, the first lens may have a shape in which both surfaces thereof are convex. At least one of the first and second surfaces of the first lens may be an aspheric surface. For example, both surfaces of the first lens may be aspheric surfaces. The first lens may be formed of a material having high light transmissivity and high workability. For example, the first lens may be formed of a plastic material. However, a material of the first lens is not limited to the plastic material. For example, the first lens may be formed of a glass material.

The second lens may have refractive power. For example, the second lens may have negative refractive power. The second lens may have a shape in which both surfaces thereof are concave. Alternatively, the second lens may have a shape in which a first surface thereof is convex and a second surface thereof is concave. For example, the second lens may have a meniscus shape in which it is convex toward the imaging object or a plano-convex shape in which it is convex toward the imaging object. At least one of the first and second surfaces of the second lens may be an aspheric surface. For example, both surfaces of the second lens may be aspheric surfaces. The second lens may be formed of a material having high light transmissivity and high workability. For example, the second lens may be formed of a plastic material. However, a material of the second lens is not limited to the plastic material. For example, the second lens may be formed of a glass material.

The third lens may have refractive power. For example, the third lens may have negative refractive power. The third lens may have a shape in which both surfaces thereof are concave. Alternatively, the third lens may have a shape in which a first surface thereof is convex and a second surface thereof is concave. For example, the third lens may have a meniscus shape in which it is convex toward the imaging object or a plano-convex shape in which it is convex toward the imaging object. At least one of the first and second surfaces of the third lens may be an aspheric surface. For example, both surfaces of the third lens may be aspheric surfaces. The third lens may be formed of a material having high light transmissivity and high workability. For example, the third lens may be formed of a plastic material. However, a material of the third lens is not limited to the plastic material. For example, the third lens may be formed of a glass material.

The fourth lens may have refractive power. For example, the fourth lens may have a positive or negative refractive power. The fourth lens may have a shape in which both surfaces thereof are convex. Alternatively, the fourth lens may have a shape in which a first surface thereof is convex and a second surface thereof is concave. For example, the fourth lens may have a meniscus shape in which it is convex toward the imaging object or a plano-convex shape in which it is convex toward the imaging object. Alternatively, the fourth lens may have a shape in which a first surface thereof is concave and a second surface thereof is convex. For example, the fourth lens may have a meniscus shape in which it is convex toward the image or a plano-convex shape in which it is convex toward the image. At least one of the first and second surfaces of the fourth lens may be an aspheric surface. For example, both surfaces of the fourth lens may be aspheric surfaces. The fourth lens may be formed of a material having high light transmissivity and high workability. For example, the fourth lens may be formed of a plastic material. However, a material of the fourth lens is not limited to the plastic material. For example, the fourth lens may be formed of a glass material.

The fifth lens may have refractive power. For example, the fifth lens may have negative refractive power. The fifth lens may have a shape in which a first surface thereof is concave and a second surface thereof is convex. For example, the fifth lens may have a meniscus shape in which it is convex toward the image. At least one of the first and second surfaces of the fifth lens may be an aspheric surface. For example, both surfaces of the fifth lens may be aspheric surfaces. The fifth lens may be formed of a material having high light transmissivity and high workability. For example, the fifth lens may be formed of a plastic material. However, a material of the fifth lens is not limited to the plastic material. For example, the fifth lens may be formed of a glass material.

The sixth lens may have refractive power. For example, the sixth lens may have a positive or negative refractive power. The sixth lens may have a shape in which a first surface thereof is convex and a second surface thereof is concave. In addition, the sixth lens may have a shape in which a point of inflection is formed on at least one surface thereof. For example, the sixth lens may have a shape in which the second surface thereof is concave at the center of an optical axis and becomes convex toward an edge thereof. At least one of the first and second surfaces of the sixth lens may be an aspheric surface. For example, both surfaces of the sixth lens may be aspheric surfaces. The sixth lens may be formed of a material having high light transmissivity and high workability. For example, the sixth lens may be formed of a plastic material. However, a material of the sixth lens is not limited to the plastic material. For example, the sixth lens may be formed of a glass material.

The lens module configured as described above may improve aberration, which causes image quality deterioration. In addition, the lens module configured as described above may improve resolution. Further, the lens module configured as described above may allow for product lightness and be advantageous in decreasing manufacturing costs.

A lens module according to an exemplary embodiment of the present disclosure will be described with reference to FIGS. 1 through 4.

The lens module 100 according to an exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In an exemplary embodiment of the present disclosure, the first lens 10 may have positive refractive power. In addition, the first lens 10 may have a shape in which a first surface thereof is convex and a second surface thereof is convex. The second lens 20 may have negative refractive power. In addition, the second lens 20 may have a shape in which a first surface thereof is concave and a second surface thereof is concave. The third lens 30 may have negative refractive power. In addition, the third lens 30 may have a shape in which a first surface thereof is convex and a second surface thereof is concave. The fourth lens 40 may have positive refractive power. In addition, the fourth lens 40 may have a shape in which a first surface thereof is convex and a second surface thereof is concave. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to an exemplary embodiment of the present disclosure may include one or more stops ST1, ST2, and ST3. For example, a first stop ST1 may be disposed before the first lens 10, and second and third stops ST2 and ST3 may be disposed before the third lens 30. Here, the first stop ST1 may be provided in order to control an amount of light, and the second and third stops ST2 and ST3 may be provided for vignetting.

An overall focal length f of the lens module according to an exemplary embodiment of the present disclosure may be 4.10 mm, an F No. thereof may be 2.20, an ANG thereof may be 73.0, and an IMGH thereof may be 6.12 mm.

The lens module configured as described above may have aberration characteristics as shown in FIGS. 2 and 3. In addition, lens characteristics of the lens module configured as described above are shown in FIG. 4.

Next, a lens module according to another exemplary embodiment of the present disclosure will be described with reference to FIGS. 5 through 8.

The lens module 100 according to another exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In another exemplary embodiment of the present disclosure, the first lens 10 may have positive refractive power. In addition, the first lens 10 may have a shape in which a first surface thereof is convex and a second surface thereof is convex. The second lens 20 may have negative refractive power. In addition, the second lens 20 may have a shape in which a first surface thereof is convex and a second surface thereof is concave. The third lens 30 may have negative refractive power. In addition, the third lens 30 may have a shape in which a first surface thereof is convex and a second surface thereof is concave. The fourth lens 40 may have positive refractive power. In addition, the fourth lens 40 may have a shape in which a first surface thereof is convex and a second surface thereof is concave. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to another exemplary embodiment of the present disclosure may include one or more stops ST1 and ST2. For example, a first stop ST1 may be disposed before the first lens 10, and a second stop ST2 may be disposed after the third lens 30. Here, the first stop ST1 may be provided in order to control an amount of light, and the second stop ST2 may be provided for vignetting.

An overall focal length f of the lens module according to another exemplary embodiment of the present disclosure may be 4.13 mm, an F No. thereof may be 2.20, an ANG thereof may be 73.0, and an IMGH thereof may be 6.22 mm.

The lens module configured as described above may have aberration characteristics as shown in FIGS. 6 and 7. For reference, lens characteristics of the lens module configured as described above are shown in FIG. 8.

Next, a lens module according to another exemplary embodiment of the present disclosure will be described with reference to FIGS. 9 through 12.

The lens module 100 according to another exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In another exemplary embodiment of the present disclosure, the first lens 10 may have positive refractive power. In addition, the first lens 10 may have a shape in which a first surface thereof is convex and a second surface thereof is concave. The second lens 20 may have negative refractive power. In addition, the second lens 20 may have a shape in which a first surface thereof is convex and a second surface thereof is concave. The third lens 30 may have negative refractive power. In addition, the third lens 30 may have a shape in which a first surface thereof is concave and a second surface thereof is concave. The fourth lens 40 may have positive refractive power. In addition, the fourth lens 40 may have a shape in which a first surface thereof is convex and a second surface thereof is convex. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to another exemplary embodiment of the present disclosure may include one or more stops ST1 and ST2. For example, a first stop ST1 may be disposed before the first lens 10, and a second stop ST2 may be disposed before the third lens 30. Here, the first stop ST1 may be provided in order to control an amount of light, and the second stop ST2 may be provided for vignetting.

An overall focal length f of the lens module according to another exemplary embodiment of the present disclosure may be 4.08 mm, an F No. thereof may be 2.20, an ANG thereof may be 73.0, and an IMGH thereof may be 6.09 mm.

The lens module configured as described above may have aberration characteristics as shown in FIGS. 10 and 11. For reference, lens characteristics of the lens module configured as described above are shown in FIG. 12.

Next, a lens module according to another exemplary embodiment of the present disclosure will be described with reference to FIGS. 13 through 16.

The lens module 100 according to another exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In another exemplary embodiment of the present disclosure, the first lens 10 may have positive refractive power. In addition, the first lens 10 may have a shape in which a first surface thereof is convex and a second surface thereof is convex. The second lens 20 may have negative refractive power. In addition, the second lens 20 may have a shape in which a first surface thereof is convex and a second surface thereof is concave. The third lens 30 may have negative refractive power. In addition, the third lens 30 may have a shape in which a first surface thereof is concave and a second surface thereof is convex. The fourth lens 40 may have positive refractive power. In addition, the fourth lens 40 may have a shape in which a first surface thereof is concave and a second surface thereof is convex. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to another exemplary embodiment of the present disclosure may include one or more stops ST1 and ST2. For example, a first stop ST1 may be disposed before the first lens 10, and a second stop ST2 may be disposed before the third lens 30. Here, the first stop ST1 may be provided in order to control an amount of light, and the second stop ST2 may be provided for vignetting.

An overall focal length f of the lens module according to another exemplary embodiment of the present disclosure may be 4.04 mm, an F No. thereof may be 2.20, an ANG thereof may be 73.0, and an IMGH thereof may be 6.12 mm.

The lens module configured as described above may have aberration characteristics as shown in FIGS. 14 and 15. For reference, lens characteristics of the lens module configured as described above are shown in FIG. 16.

Next, a lens module according to another exemplary embodiment of the present disclosure will be described with reference to FIGS. 17 through 20.

The lens module 100 according to another exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In another exemplary embodiment of the present disclosure, the first lens 10 may have positive refractive power. In addition, the first lens 10 may have a shape in which a first surface thereof is convex and a second surface thereof is concave. The second lens 20 may have negative refractive power. In addition, the second lens 20 may have a shape in which a first surface thereof is convex and a second surface thereof is concave. The third lens 30 may have negative refractive power. In addition, the third lens 30 may have a shape in which a first surface thereof is convex and a second surface thereof is concave. The fourth lens 40 may have positive refractive power. In addition, the fourth lens 40 may have a shape in which a first surface thereof is convex and a second surface thereof is convex. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to another exemplary embodiment of the present disclosure may include one or more stops ST1, ST2, and ST3. For example, a first stop ST1 may be disposed before the first lens 10, and second and third stops ST2 and ST3 may be disposed before the third lens 30. Here, the first stop ST1 may be provided in order to control an amount of light, and the second and third stops ST2 and ST3 may be provided for vignetting.

An overall focal length f of the lens module according to another exemplary embodiment of the present disclosure may be 4.20 mm, an F No. thereof may be 1.91, an ANG thereof may be 73.0, and an IMGH thereof may be 6.22 mm.

The lens module configured as described above may have aberration characteristics as shown in FIGS. 18 and 19. For reference, lens characteristics of the lens module configured as described above are shown in FIG. 20.

Next, a lens module according to another exemplary embodiment of the present disclosure will be described with reference to FIGS. 21 through 24.

The lens module 100 according to another exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In another exemplary embodiment of the present disclosure, the first lens 10 may have positive refractive power. In addition, the first lens 10 may have a shape in which a first surface thereof is convex and a second surface thereof is concave. The second lens 20 may have negative refractive power. In addition, the second lens 20 may have a shape in which a first surface thereof is convex and a second surface thereof is concave. The third lens 30 may have negative refractive power. In addition, the third lens 30 may have a shape in which a first surface thereof is convex and a second surface thereof is concave. The fourth lens 40 may have positive refractive power. In addition, the fourth lens 40 may have a shape in which a first surface thereof is convex and a second surface thereof is convex. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to another exemplary embodiment of the present disclosure may include one or more stops ST1, ST2, and ST3. For example, a first stop ST1 may be disposed before the first lens 10, and second and third stops ST2 and ST3 may be disposed before the third lens 30. Here, the first stop ST1 may be provided in order to control an amount of light, and the second and third stops ST2 and ST3 may be provided for vignetting.

An overall focal length f of the lens module according to another exemplary embodiment of the present disclosure may be 4.11 mm, an F No. thereof may be 1.67, an ANG thereof may be 73.0, and an IMGH thereof may be 6.24 mm.

The lens module configured as described above may have aberration characteristics as shown in FIGS. 22 and 23. For reference, lens characteristics of the lens module configured as described above are shown in FIG. 24.

Next, a lens module according to another exemplary embodiment of the present disclosure will be described with reference to FIGS. 25 through 28.

The lens module 100 according to another exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In another exemplary embodiment of the present disclosure, the first lens 10 may have positive refractive power. In addition, the first lens 10 may have a shape in which a first surface thereof is convex and a second surface thereof is concave. The second lens 20 may have negative refractive power. In addition, the second lens 20 may have a shape in which a first surface thereof is convex and a second surface thereof is concave. The third lens 30 may have negative refractive power. In addition, the third lens 30 may have a shape in which a first surface thereof is convex and a second surface thereof is concave. The fourth lens 40 may have positive refractive power. In addition, the fourth lens 40 may have a shape in which a first surface thereof is convex and a second surface thereof is convex. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to another exemplary embodiment of the present disclosure may include one or more stops ST1, ST2, and ST3. For example, a first stop ST1 may be disposed before the first lens 10, and second and third stops ST2 and ST3 may be disposed before the third lens 30. Here, the third stop ST3 may be provided in order to control an amount of light, and the first and second stops ST1 and ST2 may be provided for vignetting.

An overall focal length f of the lens module according to another exemplary embodiment of the present disclosure may be 4.18 mm, an F No. thereof may be 1.92, an ANG thereof may be 73.0, and an IMGH thereof may be 6.24 mm.

The lens module configured as described above may have aberration characteristics as shown in FIGS. 26 and 27. For reference, lens characteristics of the lens module configured as described above are shown in FIG. 28.

Next, a lens module according to another exemplary embodiment of the present disclosure will be described with reference to FIGS. 29 through 32.

The lens module 100 according to another exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80.

In another exemplary embodiment of the present disclosure, the first lens 10 may have positive refractive power. In addition, the first lens 10 may have a shape in which a first surface thereof is convex and a second surface thereof is concave. The second lens 20 may have negative refractive power. In addition, the second lens 20 may have a shape in which a first surface thereof is convex and a second surface thereof is concave. The third lens 30 may have negative refractive power. In addition, the third lens 30 may have a shape in which a first surface thereof is convex and a second surface thereof is concave. The fourth lens 40 may have positive refractive power. In addition, the fourth lens 40 may have a shape in which a first surface thereof is convex and a second surface thereof is convex. The fifth lens 50 may have negative refractive power. In addition, the fifth lens 50 may have a shape in which a first surface thereof is concave and a second surface thereof is convex. The sixth lens 60 may have negative refractive power. In addition, the sixth lens 60 may have a shape in which a first surface thereof is convex and a second surface thereof is concave. Further, the sixth lens 60 may have a point of inflection. For example, the sixth lens 60 may have a point of inflection formed on the second surface thereof.

The lens module 100 according to another exemplary embodiment of the present disclosure may include one or more stops ST1, ST2, and ST3. For example, a first stop ST1 may be disposed before the first lens 10, and second and third stops ST2 and ST3 may be disposed before the third lens 30. Here, the first stop ST1 may be provided in order to control an amount of light, and the second and third stops ST2 and ST3 may be provided for vignetting.

An overall focal length f of the lens module according to another exemplary embodiment of the present disclosure may be 4.42 mm, an F No. thereof may be 1.92, an ANG thereof may be 68.0, and an IMGH thereof may be 6.03 mm.

The lens module configured as described above may have aberration characteristics as shown in FIGS. 30 and 31. For reference, lens characteristics of the lens module configured as described above are shown in FIG. 32.

Although the optical systems according to exemplary embodiments of the present disclosure described above have some different characteristics as shown in Table 1, they may satisfy all of Conditional Equations 1 to 5.

TABLE 1

| Remark | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment | Eighth Exemplary Embodiment |
|---|---|---|---|---|---|---|---|---|
| TTL | 4.92 | 4.93 | 4.84 | 4.87 | 5.01 | 5.05 | 5.11 | 5.18 |
| IMGH | 6.12 | 6.22 | 6.09 | 6.12 | 6.22 | 6.24 | 6.24 | 6.03 |
| SL | 4.92 | 4.93 | 4.84 | 4.87 | 5.01 | 5.05 | 3.78 | 5.18 |
| ANG | 73.00 | 73.00 | 73.00 | 73.00 | 73.00 | 73.00 | 73.00 | 68.00 |
| f | 4.10 | 4.13 | 4.08 | 4.04 | 4.20 | 4.11 | 4.18 | 4.42 |
| F No. | 2.20 | 2.20 | 2.20 | 2.20 | 1.91 | 1.67 | 1.92 | 1.92 |
| TTL/IMGH | 0.80 | 0.79 | 0.79 | 0.80 | 0.81 | 0.81 | 0.82 | 0.86 |
| SL/TTL | 1.00 | 1.00 | 1.00 | 1.00 | 1.00 | 1.00 | 0.74 | 1.00 |
| ANG/(F No.) | 33.2 | 33.2 | 33.2 | 33.2 | 38.2 | 43.7 | 38.0 | 35.4 |
| f5/f1 | −104.6 | −55.5 | −64.6 | −91.2 | −25.9 | −12.7 | −9.9 | −104.7 |

As set forth above, according to exemplary embodiments of the present disclosure, aberration may be easily corrected and a high resolution may be implemented.

Further, according to exemplary embodiments of the present disclosure, since an optical system may be configured only using plastic lenses, the optical system may be relatively light and a costs required for the manufacturing thereof may be decreased.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
a first lens having positive refractive power of which an image-side surface is convex;
a second lens having negative refractive power of which an image-side surface is concave;
a third lens having negative refractive power;
a fourth lens having refractive power;
a fifth lens having negative refractive power and having a shape in which an image-side surface thereof is convex; and
a sixth lens having refractive power, having a shape in which an image-side surface thereof is concave, and having at least one point of inflection formed on the image-side surface thereof,
wherein an optical system including the first to sixth lenses satisfies Conditional Equation 5:

$$|f5/f1| > 9.0 \quad \text{[Conditional Equation 5]}$$

where f5 indicates a focal length [mm] of the fifth lens and f1 indicates a focal length [mm] of the first lens.

2. The lens module of claim 1, wherein the first lens has a shape in which an object-side surface thereof is convex.

3. The lens module of claim 1, wherein the fifth lens has a shape in which an object-side surface thereof is concave and the image-side surface thereof is convex.

4. The lens module of claim 1, wherein the sixth lens has a shape in which an object-side surface thereof is convex.

5. The lens module of claim 1, wherein an optical system including the first to sixth lenses satisfies Conditional Equation 1:

$$TTL/IMGH < 2.0 \quad \text{[Conditional Equation 1]}$$

where TTL indicates a distance [mm] from an object-side surface of the first lens to an imaging surface and IMGH indicate a diagonal distance [mm] of the imaging surface of an image sensor.

6. The lens module of claim 1, wherein an optical system including the first to sixth lenses satisfies Conditional Equation 2:

$$0.7 < SL/TTL < 1.1 \quad \text{[Conditional Equation 2]}$$

where SL indicates a distance from a stop to an imaging surface and TTL indicates a distance [mm] from an imaging object-side surface of the first lens to the imaging surface.

7. The lens module of claim 1, wherein an optical system including the first to sixth lenses satisfies Conditional Equation 3:

$$ANG/F\,No. > 34 \quad \text{[Conditional Equation 3]}$$

where ANG indicates a field of view of the optical system and F No. indicates a numerical value indicating brightness of the optical system.

8. The lens module of claim 1, wherein an optical system including the first to sixth lenses satisfies Conditional Equation 4:

$$F\,No. < 2.4 \quad \text{[Conditional Equation 4]}$$

where F No. indicates a numerical value indicating brightness of the optical system.

9. A lens module comprising:
a first lens having positive refractive power of which an image-side surface is convex;
a second lens having refractive power and having a shape in which an image-side surface thereof is concave;
a third lens having negative refractive power;
a fourth lens having refractive power;
a fifth lens having negative refractive power and having a shape in which an imaging object-side surface thereof is concave; and
a sixth lens having refractive power, having a shape in which an image-side surface thereof is concave, and having at least one point of inflection formed on the image-side surface thereof,
wherein an optical system including the first to sixth lenses satisfies Conditional Equation 5:

$$|f5/f1| > 9.0 \quad \text{[Conditional Equation 5]}$$

where f5 indicates a focal length [mm] of the fifth lens and f1 indicates a focal length [mm] of the first lens.

10. The lens module of claim 9, wherein the first lens has a shape in which an imaging object-side surface thereof is convex.

11. The lens module of claim 9, wherein the second lens has negative refractive power.

12. The lens module of claim 9, wherein the fifth lens has a shape in which an image-side surface thereof is convex.

13. The lens module of claim 9, wherein the sixth lens has a shape in which an imaging object-side surface thereof is convex.

14. The lens module of claim 9, wherein an optical system including the first to sixth lenses satisfies Conditional Equation 1:

$$TTL/IMGH<2.0 \qquad \text{[Conditional Equation 1]}$$

where TTL indicates a distance [mm] from an imaging object-side surface of the first lens to an imaging surface and IMGH indicates a diagonal distance [mm] of the imaging surface of an image sensor.

15. The lens module of claim 9, wherein an optical system including the first to sixth lenses satisfies Conditional Equation 2:

$$0.7<SL/TTL<1.1 \qquad \text{[Conditional Equation 2]}$$

where SL indicates a distance from a stop to an imaging surface and TTL indicates a distance [mm] from an imaging object-side surface of the first lens to the imaging surface.

16. The lens module of claim 9, wherein an optical system including the first to sixth lenses satisfies Conditional Equation 3:

$$ANG/F\,No.>34 \qquad \text{[Conditional Equation 3]}$$

where ANG indicates a field of view of the optical system and F No. indicates a numerical value indicating brightness of the optical system.

17. The lens module of claim 9, wherein an optical system including the first to sixth lenses satisfies Conditional Equation 4:

$$F\,No.<2.4 \qquad \text{[Conditional Equation 4]}$$

where F No. indicates a numerical value indicating brightness of the optical system.

18. A lens module comprising:
a first lens having positive refractive power;
a second lens having negative refractive power of which an image-side surface is concave;
a third lens having negative refractive power;
a fourth lens having positive refractive power of which an object-side surface is convex;
a fifth lens having negative refractive power; and
a sixth lens having negative refractive power and having at least one point of inflection formed on an image-side surface thereof,
wherein an optical system including the first to sixth lenses satisfies the following Conditional Equation 5:

$$|f5/f1|>9.0 \qquad \text{[Conditional Equation 5]}$$

where f5 indicates a focal length [mm] of the fifth lens and f1 indicates a focal length [mm] of the first lens.

19. The lens module of claim 18, wherein the first lens has a shape in which an imaging object-side surface thereof is convex.

20. The lens module of claim 18, wherein the second lens has a shape in which an image-side surface thereof is concave.

21. The lens module of claim 18, wherein the third lens has a shape in which an image-side surface thereof is concave.

22. The lens module of claim 18, wherein the fifth lens has a shape in which an imaging object-side surface thereof is concave.

23. The lens module of claim 18, wherein the fifth lens has a shape in which an image-side surface thereof is convex.

24. The lens module of claim 18, wherein the sixth lens has a shape in which an imaging object-side surface thereof is convex and the image-side surface thereof is concave.

25. The lens module of claim 18, wherein the optical system including the first to sixth lenses satisfies the following Conditional Equation:

$$TTL/IMGH<2.0 \qquad \text{[Conditional Equation]}$$

where TTL indicates a distance [mm] from an imaging object-side surface of the first lens to an imaging surface and IMGH indicates a diagonal distance [mm] of the imaging surface of an image sensor.

26. The lens module of claim 18, wherein the optical system including the first to sixth lenses satisfies the following Conditional Equation:

$$0.7<SL/TTL<1.1 \qquad \text{[Conditional Equation]}$$

where SL indicates a distance from a stop to an imaging surface and TTL indicates a distance [mm] from an imaging object-side surface of the first lens to the imaging surface.

27. The lens module of claim 18, wherein the optical system including the first to sixth lenses satisfies the following Conditional Equation:

$$F\,No.<2.3 \qquad \text{[Conditional Equation]}$$

where F No. indicates a numerical value indicating brightness of the optical system.

* * * * *